US011863492B2

(12) United States Patent
Hu et al.

(10) Patent No.: US 11,863,492 B2
(45) Date of Patent: Jan. 2, 2024

(54) COMMUNICATIONS METHOD, APPARATUS, AND DEVICE

(71) Applicant: Huawei Technologies Co., Ltd., Shenzhen (CN)

(72) Inventors: Dan Hu, Beijing (CN); Jiafeng Shao, Beijing (CN); Lei Guan, Beijing (CN); Ruixiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 17/216,144

(22) Filed: Mar. 29, 2021

(65) Prior Publication Data

US 2021/0218539 A1    Jul. 15, 2021

Related U.S. Application Data

(63) Continuation of application No. PCT/CN2019/104753, filed on Sep. 6, 2019.

(30) Foreign Application Priority Data

Sep. 28, 2018  (CN) .......................... 201811141655.5
Nov. 2, 2018  (CN) .......................... 201811300414.0

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04W 72/0453* (2013.01); *H04W 72/23* (2023.01)

(58) Field of Classification Search
CPC ... H04L 1/1812; H04L 5/0055; H04L 1/1861; H04L 5/0023; H04W 72/21;
(Continued)

(56) References Cited

U.S. PATENT DOCUMENTS

2014/0161060 A1   6/2014  Nam et al.
2014/0301324 A1*  10/2014 Cheng .................. H04L 5/0055
                                             370/329
(Continued)

FOREIGN PATENT DOCUMENTS

CN   107027184 A   8/2017
CN   107113122 A   8/2017
(Continued)

OTHER PUBLICATIONS

Vivo, "Layer 1 enhancements for URLLC," 3GPP TSG RAN WG1 Meeting #94, Gothenburg, Sweden, R1-1808248, total 10 pages, 3rd Generation Partnership Project, Valbonne, France (Aug. 20-24, 2018).

(Continued)

*Primary Examiner* — Allahyar Kasraian
(74) *Attorney, Agent, or Firm* — Leydig, Voit & Mayer, Ltd.

(57) ABSTRACT

A communications method, and apparatus are provided, to reduce a transmission latency when a plurality of HARQ-ACKs are transmitted in one time unit. The method includes: determining, in N groups of time-frequency resources based on the grouping relationship, the $i^{th}$ group of time-frequency (Continued)

resources corresponding to a first parameter related to the first DCI, receiving first DCI, and determining a first uplink channel that carries a first HARQ-ACK on a first time-frequency resource in the $i^{th}$ group of time-frequency resources, where the grouping relationship represents a correspondence between a first parameter and N groups of time-frequency resources, the N groups of time-frequency resources are obtained by grouping time-frequency resources in one time unit, each group of time-frequency resources corresponds to one or more first parameters, and the first parameter is related to DCI, a time-frequency resource in each group of time-frequency resources is for an uplink channel carries a HARQ-ACK.

20 Claims, 12 Drawing Sheets

(51) Int. Cl.
*H04W 72/0453* (2023.01)
*H04W 72/23* (2023.01)

(58) Field of Classification Search
CPC ......... H04W 72/0446; H04W 72/1268; H04W 72/1273; H04W 72/23; H04W 72/0453; H04W 72/04
See application file for complete search history.

(56) References Cited

U.S. PATENT DOCUMENTS

| | | | |
|---|---|---|---|
| 2018/0278373 A1* | 9/2018 | Wang | H04L 5/0055 |
| 2019/0182012 A1* | 6/2019 | Liu | H04W 72/04 |
| 2020/0187237 A1* | 6/2020 | Su | H04L 1/08 |
| 2020/0295878 A1* | 9/2020 | Choi | H04W 28/04 |

FOREIGN PATENT DOCUMENTS

| | | |
|---|---|---|
| CN | 107872303 A | 4/2018 |
| WO | 2016184211 A1 | 11/2016 |
| WO | 2017105158 A1 | 6/2017 |
| WO | 2018111571 A1 | 6/2018 |
| WO | 2018128356 A1 | 7/2018 |
| WO | 2018170868 A1 | 9/2018 |
| WO | 2018170878 A1 | 9/2018 |
| WO | 2018175396 A1 | 9/2018 |

OTHER PUBLICATIONS

LG Electronics, "Discussion on layer 1 enhancements," 3GPP TSG RAN WG1 Meeting #94, Gothenburg, Sweden, R1-1808531, total 10 pages, 3rd Generation Partnership Project, Valbonne, France (Aug. 20-24, 2018).

Huawei, HiSilicon, "L1 enhancements for URLLC," 3GPP TSG RAN WG1 Meeting #94, Gothenburg, Sweden, R1-1809516, total 21 pages, 3rd Generation Partnership Project, Valbonne, France (Aug. 20-24, 2018).

* cited by examiner

COMMUNICATIONS METHOD, APPARATUS, AND DEVICE

CROSS-REFERENCE TO RELATED APPLICATIONS

This application is a continuation of International Patent Application No. PCT/CN2019/104753, filed on Sep. 6, 2019, which claims priority to Chinese Patent Application No. 201811141655.5, filed on Sep. 28, 2018, and Chinese Patent Application No. 201811300414.0, filed on Nov. 2, 2018. The disclosures of the aforementioned applications are hereby incorporated by reference in their entireties.

TECHNICAL FIELD

This application relates to the field of mobile communications technologies, and in particular, to a communications method, apparatus, and device.

BACKGROUND

The international telecommunication union (ITU) defines three types of application scenarios for the fifth generation mobile communications system (5G) and a future mobile communications system: enhanced mobile broadband (eMBB), ultra reliable and low-latency communication (URLLC), and massive machine-type communications (mMTC).

A URLLC service has a very high requirement on a latency. A latency of unidirectional transmission from a transmit end to a receive end is required to be within 0.5 milliseconds (ms), and transmission reliability needs to reach 99.999% within 1 ms.

Because an eMBB service does not have a high requirement on a data transmission latency, in the prior art, only one uplink channel such as a physical uplink control channel (PUCCH) that carries a hybrid automatic repeat request-acknowledgment (HARQ)-(ACK) is transmitted in each slot. If HARQ-ACKs corresponding to a plurality of physical downlink shared channels (PDSCH) are fed back in one slot, the plurality of HARQ-ACKs are jointly encoded into one HARQ-ACK codebook and the HARQ-ACK codebook is carried on one uplink channel such as a PUCCH for sending. This method is not conducive to reducing a HARQ-ACK feedback latency, and cannot be applicable to data transmission of a service that requires a low latency, for example, transmission of the URLLC service.

SUMMARY

Embodiments of this application provide a communications method, apparatus, and device, to reduce a transmission latency when a plurality of HARQ-ACKs are transmitted in one time unit.

According to a first aspect, a communications method is provided. The method may be performed by a terminal device or a communications apparatus (for example, a chip system) that can support the terminal device in implementing the method. In this application, an example in which the terminal device performs the method is used for description. The method includes: obtaining a grouping relationship; receiving first DCI; determining, in N groups of time-frequency resources based on the grouping relationship, the $i^{th}$ group of time-frequency resources corresponding to a first parameter related to the first DCI; and determining a first uplink channel that carries a first HARQ-ACK on a first time-frequency resource in the $i^{th}$ group of time-frequency resources.

The grouping relationship represents a correspondence between a first parameter and the N groups of time-frequency resources, the N groups of time-frequency resources are obtained by grouping time-frequency resources in one time unit, each group of time-frequency resources in the N groups of time-frequency resources corresponds to one or more first parameters, the first parameter is related to DCI, a time-frequency resource in each group of time-frequency resources is a time-frequency resource of an uplink channel that carries a HARQ-ACK, N is a positive integer greater than or equal to 2, and i is a positive integer less than or equal to N.

In the communications method provided in this embodiment of this application, time-frequency resources in a time unit are grouped into N groups of time-frequency resources, and each group of time-frequency resources in the N groups of time-frequency resources is available for transmitting an uplink channel that carries a HARQ-ACK. In other words, in comparison with the prior art in which one time unit can be used to transmit only one uplink channel that carries a HARQ-ACK, in the method provided in this embodiment of this application, one time unit is available for transmitting N uplink channels that carry HARQ-ACKs. In this way, when a plurality of uplink channels that carry HARQ-ACKs need to be transmitted in one time unit, an uplink channel that carries a HARQ-ACK and that needs to be sent earlier in time domain in the time unit does not need to be sent on a same PUCCH resource as a last uplink channel that carries a HARQ-ACK. In other words, according to the method in this application, a HARQ-ACK that arrives earlier can be sent earlier, to reduce a transmission latency and improve transmission efficiency.

In a possible design, the first parameter includes one or more of a K1 value, a first time length, a codebook identifier, a radio network temporary identifier (RNTI), an uplink channel end symbol, a physical downlink control channel (physical downlink control channel, PDCCH) monitoring occasion, or a start and length indicator value (SLIV) index. The K1 value is the quantity of time units offset from a time unit in which a PDSCH is located to a time unit in which an uplink channel of a HARQ-ACK corresponding to the PDSCH is located. The first time length is a unit time length of the K1 value or the first time length represents a time length corresponding to the K1 value.

In this embodiment of this application, the first time-frequency resource may be some time-frequency resources in the $i^{th}$ group of time-frequency resources, or may be all time-frequency resources in the $i^{th}$ group of time-frequency resources. The uplink channel may include a physical uplink control channel (PUCCH) or a physical uplink shared channel (PUSCH).

In this embodiment of this application, the terminal device may receive the grouping relationship from a network device, or the terminal device locally obtains the grouping relationship.

In this embodiment of this application, if the grouping relationship is received by the terminal device from the network device, before the network device sends the grouping relationship to the terminal device, the network device may further determine the grouping relationship based on one or more of the following conditions:

condition 1: the K1 value, where the K1 value may be semi-statically configured or predefined;

condition 2: the first time length, where the first time length may be semi-statically configured or predefined;

condition 3: the SLIV index, where the SLIV index may be semi-statically configured or predefined, and in this embodiment of this application, an SLIV is an SLIV of a PDSCH corresponding to a HARQ-ACK;

condition 4: the codebook identifier, where the codebook identifier is used to indicate a group of time-frequency resources that carry a HARQ-ACK in the N groups of time-frequency resources, the codebook identifier may include N values, each value corresponds to a group of time-frequency resources in the N groups of time-frequency resources, and the codebook identifier may be included in DCI;

condition 5: the RNTI, where the RNTI is used to scramble DCI;

condition 6: the uplink channel end symbol; and condition 7: the PDCCH monitoring occasion.

It may be understood that the quantity of pieces of DCI received by the terminal device is not limited in this application. In a possible design, the terminal device may further receive second DCI, and determine, in the N groups of time-frequency resources based on the grouping relationship, the $k^{th}$ group of time-frequency resources corresponding to a first parameter related to the second DCI. The terminal device determines a second uplink channel that carries a second HARQ-ACK on a second time-frequency resource in the $k^{th}$ group of time-frequency resources, where k is a positive integer less than or equal to N, and k and i are different values.

In the foregoing possible design, the first time-frequency resource may overlap or may not overlap the second time-frequency resource. The following separately describes a case in which the first time-frequency resource overlaps the second time-frequency resource and a case in which the first time-frequency resource does not overlap the second time-frequency resource.

In a possible design, the first time-frequency resource does not overlap the second time-frequency resource, and the terminal device sends the first uplink channel on a first time domain resource, and sends the second uplink channel on a second time domain resource. In this way, the terminal device may transmit, respectively on two different groups of time-frequency resources in the N groups of time-frequency resources, the first uplink channel that carries the first HARQ-ACK and the second uplink channel that carries the second HARQ-ACK. The first uplink channel and the second uplink channel do not need to be sent on a same PUCCH resource, and a HARQ-ACK that arrives earlier in the first HARQ-ACK and the second HARQ-ACK may be fed back earlier. This can reduce a transmission latency to some extent.

In a possible design, when the first time-frequency resource partially or fully overlaps the second time-frequency resource, the terminal device may combine the first HARQ-ACK and the second HARQ-ACK into a third HARQ-ACK, and the terminal device determines a third uplink channel that carries the third HARQ-ACK on a third time-frequency resource, where the third time-frequency resource is a time-frequency resource in a group of time-frequency resources included in the N groups of time-frequency resources.

In this embodiment of this application, before determining the third uplink channel that carries the third HARQ-ACK on the third time-frequency resource, the terminal device may further determine the third time-frequency resource. The following provides two methods for determining the third time-frequency resource.

In a possible implementation, the terminal device selects a group of time-frequency resources from the $i^{th}$ group of time-frequency resources or the $k^{th}$ group of time-frequency resources, and determines the third time-frequency resource in the group of time-frequency resources. The following provides description by using an example in which the terminal device determines the third time-frequency resource in the $i^{th}$ group of time-frequency resources. When determining that the first uplink channel meets one or more of the following conditions, the terminal device may determine the third time-frequency resource in the $i^{th}$ group of time-frequency resources. This may alternatively be understood as: The third time-frequency resource is a time-frequency resource in the $i^{th}$ group of time-frequency resources when the first uplink channel meets one or more of the following conditions:

Condition 1: A first time length corresponding to the first uplink channel is shorter than a first time length corresponding to the second uplink channel. It may be understood that when a plurality of time-frequency resources overlap, the terminal device may determine the third time-frequency resource in the $i^{th}$ group of time-frequency resources when determining that the first time length corresponding to the first uplink channel is a smallest first time length or is one of smallest first time lengths.

Condition 2: The first uplink channel is an uplink channel corresponding to DCI scrambled with a first RNTI. The first RNTI is a new RNTI provided in this application, and has the following function: It may be determined, by using the first RNTI, that data of a PDSCH corresponding to a HARQ-ACK is from a first-type service, where the first-type service may be, for example, a URLLC service.

Condition 3: The first uplink channel is an uplink channel carried on a time-frequency resource determined based on the K1 value or the SLIV index.

In a possible implementation, the terminal device may determine the third time-frequency resource in the $i^{th}$ group of time-frequency resources by using the following method: The terminal device determines, in a first uplink channel resource group, a first uplink channel resource set corresponding to the quantity of bits of the third HARQ-ACK, where the first uplink channel resource group corresponds to an uplink channel transmitted on the $i^{th}$ group of time-frequency resources, and the first uplink channel resource group includes one or more uplink channel resource sets. The terminal device may determine the third time-frequency resource in the first uplink channel resource set after determining the first uplink channel resource set. It should be noted that in this design, the uplink channel may be a PUCCH or a PUSCH.

In a possible implementation, the uplink channel may be a PUCCH, and the terminal device may determine the third time-frequency resource in the $i^{th}$ group of time-frequency resources by using the following method: The terminal device determines, in a first PUCCH resource group, a first PUCCH resource set corresponding to the quantity of bits of the third HARQ-ACK, where the first PUCCH resource group corresponds to a PUCCH transmitted on the $i^{th}$ group of time-frequency resources, and the first PUCCH resource group includes one or more PUCCH resource sets. The terminal device may determine the third time-frequency resource in the first PUCCH resource set after determining the first PUCCH resource set.

In a possible implementation, the terminal device may determine the third time-frequency resource by using the following method: The terminal device determines, in a second uplink channel resource group, a second uplink channel resource set corresponding to the quantity of bits of the third HARQ-ACK, where the second uplink channel resource group is configured for the uplink channel that carries the third HARQ-ACK, the second uplink channel resource group includes one or more uplink channel resource sets, and the second uplink channel resource group comprises time-frequency resources in the $j^{th}$ group of time-frequency resources in the N groups of time-frequency resources. It may also be understood that the second uplink channel resource group corresponds to an uplink channel sent on the $j^{th}$ group of time-frequency resources. After determining the second uplink channel resource set, the terminal device may determine the third time-frequency resource in the second uplink channel resource set, where j is a positive integer less than or equal to N, and j, i, and k are different values.

In a possible implementation, the uplink channel may be a PUCCH, and the terminal device may determine the third time-frequency resource by using the following method: The terminal device determines, in a second PUCCH resource group, a second PUCCH resource set corresponding to the quantity of bits of the third HARQ-ACK, where the second PUCCH resource group comprises configured for a PUCCH that carries the third HARQ-ACK, the second PUCCH resource group includes one or more PUCCH resource sets, and the second PUCCH resource group comprises time-frequency resources in the $j^{th}$ group of time-frequency resources in the N groups of time-frequency resources. This may alternatively be understood as: The second PUCCH resource group corresponds to a PUCCH sent on the $j^{th}$ group of time-frequency resources. After determining the second PUCCH resource set, the terminal device may determine the third time-frequency resource in the second PUCCH resource set, where j is a positive integer less than or equal to N, and j, i, and k are different values.

In still another possible implementation, when the first time-frequency resource partially or fully overlaps the second time-frequency resource, the terminal device sends only one uplink channel that meets a preset condition, and discards the other uplink channel. It may be understood that when more than two time-frequency resources overlap, the terminal device may send one uplink channel that meets the preset condition, and discard other uplink channels.

The foregoing preset condition is explained and described by using an example in which the terminal device sends the first uplink channel. If the terminal device sends the first uplink channel, the first uplink channel meets one or more of the following preset conditions:

Condition 1: A first time length corresponding to the first uplink channel is shorter than a first time length corresponding to the second uplink channel.

Condition 2: The first uplink channel is an uplink channel corresponding to DCI scrambled with a first RNTI.

Condition 3: The first uplink channel is an uplink channel carried on a time-frequency resource determined based on the K1 value or the SLIV index.

In a possible design, when the first time-frequency resource partially or fully overlaps the second time-frequency resource, the terminal device determines the first uplink channel that carries the first HARQ-ACK on a fourth time-frequency resource, and the second uplink channel that carries the second HARQ-ACK on a fifth time-frequency resource, where the fourth time-frequency resource is a time-frequency resource in the $m^{th}$ group of time-frequency resources included in the N groups of time-frequency resources, the fifth time-frequency resource is a time-frequency resource in the $n^{th}$ group of time-frequency resources included in the N groups of time-frequency resources, m and n are positive integers less than or equal to N, and m and n are different values.

In a possible design, that the $m^{th}$ group of time-frequency resources does not overlap the $n^{th}$ group of time-frequency resources in time domain may be understood as: No time-frequency resource in the $m^{th}$ group of time-frequency resources overlaps a time-frequency resource in the $n^{th}$ group of time-frequency resources in time domain.

In a possible design, the first uplink channel and the second uplink channel may be PUCCHs. Before determining the first uplink channel that carries the first HARQ-ACK on the fourth time-frequency resource, and the second uplink channel that carries the second HARQ-ACK on the fifth time-frequency resource, the terminal device may further determine the fourth time-frequency resource and the fifth time-frequency resource by using the following method: The terminal device determines, in a third PUCCH resource group, a third PUCCH resource set corresponding to the quantity of bits of the first HARQ-ACK, where the third PUCCH resource group includes one or more PUCCH resource sets, the third PUCCH resource group is time-frequency resources in the $m^{th}$ group of time-frequency resources. The terminal device determines the fourth time-frequency resource in the third PUCCH resource set. The terminal device determines, in a fourth PUCCH resource group, a fourth PUCCH resource set corresponding to the quantity of bits of the second HARQ-ACK, where the fourth PUCCH resource group includes one or more PUCCH resource sets, and the fourth PUCCH resource group comprises time-frequency resources in the $n^{th}$ group of time-frequency resources. The terminal device determines the fifth time-frequency resource in the fourth PUCCH resource set.

Both the third PUCCH resource group and the fourth PUCCH resource group are preconfigured, and may be preconfigured by the network device, for example, may be configured by the network device via higher layer signaling.

In a possible design, when the first time-frequency resource partially or fully overlaps the second time-frequency resource, the terminal device determines the second uplink channel that carries the second HARQ-ACK on a sixth time-frequency resource, where the sixth time-frequency resource is a time-frequency resource in the $s^{th}$ group of time-frequency resources included in the N groups of time-frequency resources, s is a positive integer less than or equal to N, and s and i are different values.

In a possible design, the sixth time-frequency resource in the $s^{th}$ group of time-frequency resources does not overlap the first time-frequency resource in the $i^{th}$ group of time-frequency resources in time domain.

In a possible design, the first uplink channel and the second uplink channel may be PUCCHs. Before determining the second uplink channel that carries the second HARQ-ACK on the sixth time-frequency resource, the terminal device may further determine the first time-frequency resource and the sixth time-frequency resource by using the following method: The terminal device determines, in a first PUCCH resource group, a fifth PUCCH resource set corresponding to the quantity of bits of the first HARQ-ACK, where the first PUCCH resource group corresponds to a PUCCH transmitted on the $i^{th}$ group of time-frequency resources, and the first PUCCH resource group includes one or more PUCCH resource sets. The terminal device determines the first time-frequency resource in the fifth PUCCH resource set. The terminal device determines, in a fifth PUCCH resource group, a sixth PUCCH resource set corresponding to the quantity of bits of the second HARQ-ACK, where the fifth PUCCH resource group includes one or more PUCCH resource sets, and the fifth PUCCH resource group is preconfigured. The terminal device determines the sixth time-frequency resource in the sixth PUCCH resource set.

In a possible design, the first uplink channel meets one or more of the following conditions:

a first time length corresponding to the first uplink channel is shorter than a first time length corresponding to the second uplink channel;

the first uplink channel is an uplink channel corresponding to DCI scrambled with a first RNTI; and the first uplink channel is an uplink channel carried on a time-frequency resource determined based on the K1 value or the SLIV index.

According to a second aspect, an embodiment of this application provides another communications method. The method may be performed by a terminal device or a communications apparatus (for example, a chip system) that can support the terminal device in implementing the method. In this application, an example in which the terminal device performs the method is used for description. The method includes: The terminal device obtains a first grouping relationship, where the first grouping relationship represents a correspondence between a first time length and N groups of time-frequency resources, the N groups of time-frequency resources are obtained by grouping time-frequency resources in one time unit, each group of time-frequency resources corresponds to one or more first time lengths, the first time length is related to a K1 set, the K1 set includes a plurality of K1 values, the K1 value is the quantity of time units offset from a time unit in which a PDSCH is located to a time unit in which an uplink channel of a HARQ-ACK corresponding to the PDSCH is located, a time-frequency resource in each group of time-frequency resources is a time-frequency resource of an uplink channel that carries a HARQ-ACK, the first time length is a unit time length of the K1 value or the first time length represents a time length corresponding to the K1 value, and N is a positive integer greater than or equal to 2.

The terminal device obtains a first K1 set and a second K1 set.

Based on the first grouping relationship, the terminal device determines, in the N groups of time-frequency resources, the $i^{th}$ group of time-frequency resources corresponding to a first time length related to the first K1 set, and determines, in the N groups of time-frequency resources, the $k^{th}$ group of time-frequency resources corresponding to a first time length related to the second K1 set, where i is a positive integer less than or equal to N, k is a positive integer less than or equal to N, and k and i are different values.

The terminal device determines a first uplink channel that carries a first HARQ-ACK on a first time-frequency resource in the $i^{th}$ group of time-frequency resources, and determines a second uplink channel that carries a second HARQ-ACK on a second time-frequency resource in the $k^{th}$ group of time-frequency resources, where the first HARQ-ACK corresponds to a first downlink association set, and the second HARQ-ACK corresponds to a second downlink association set.

When the first time-frequency resource partially or fully overlaps the second time-frequency resource, and a first downlink association subset in the first downlink association set fully overlaps a second downlink association subset in the second downlink association set, the terminal device takes a union of the first downlink association set and the second downlink association set to obtain a third downlink association set.

The first downlink association subset in the first downlink association set corresponds to a third HARQ-ACK, the second downlink association subset in the second downlink association set corresponds to a fourth HARQ-ACK, the third HARQ-ACK belongs to the first HARQ-ACK, and the fourth HARQ-ACK belongs to the second HARQ-ACK.

The terminal device sends a fifth HARQ-ACK based on the third downlink association set, where the fifth HARQ-ACK includes the third HARQ-ACK or the fourth HARQ-ACK.

According to the communications method, time-frequency resources in one time unit are grouped into N groups of time-frequency resources, and each group of time-frequency resources in the N groups of time-frequency resources is available for transmitting an uplink channel that carries a HARQ-ACK. In other words, in comparison with the prior art in which one time unit can be used to transmit only one uplink channel that carries a HARQ-ACK, in the method provided in this embodiment of this application, one time unit is available for transmitting N uplink channels that carry HARQ-ACKs. In this way, when a plurality of uplink channels that carry HARQ-ACKs need to be transmitted in one time unit, an uplink channel that carries a HARQ-ACK and that needs to be sent earlier in time domain in the time unit does not need to be sent on a same PUCCH resource as a last uplink channel that carries a HARQ-ACK. In other words, according to the method in this application, a HARQ-ACK that arrives earlier can be sent earlier, to reduce a transmission latency and improve transmission efficiency. In addition, according to the method, when time-frequency resources that carry two HARQ-ACKs overlap, the terminal device may determine that the first downlink association set scheduled by the first K1 set overlaps the second downlink association set scheduled by the second K1 set, and the terminal device sends only one group of HARQ-ACKs in HARQ-ACKs corresponding to overlapping resources, so that the quantity of transmitted bits can be reduced, thereby improving a transmission speed.

In this embodiment of this application, the first time-frequency resource may be some time-frequency resources in the $i^{th}$ group of time-frequency resources, or may be all time-frequency resources in the $i^{th}$ group of time-frequency resources. The second time-frequency resource may be some time-frequency resources in the $k^{th}$ group of time-frequency resources, or may be all time-frequency resources in the $k^{th}$ group of time-frequency resources. The uplink channel may include a physical uplink control channel (PUCCH) or a physical uplink shared channel (PUSCH).

In this embodiment of this application, the terminal device may receive the first grouping relationship from a network device, or the terminal device locally obtains the first grouping relationship.

In this embodiment of this application, if the first grouping relationship is received by the terminal device from the network device, before the network device sends the first grouping relationship to the terminal device, the network device may further determine the first grouping relationship based on the first time length.

In this embodiment of this application, the first K1 set and the second K1 set may be obtained from the network device, or may be configured via higher layer signaling.

In a possible design, the HARQ-ACK may be a semi-static codebook.

According to a third aspect, an embodiment of this application provides still another communications method. The method may be performed by a terminal device or a communications apparatus (for example, a chip system) that can support the terminal device in implementing the method. In this application, an example in which the terminal device performs the method is used for description. The method includes: The terminal device receives first DCI and second DCI; determines, in a preconfigured first PUCCH resource group, a first time-frequency resource used to send a first uplink channel; determines, in a preconfigured second PUCCH resource group, a second time-frequency resource used to send a second uplink channel; sends the first uplink channel on the first time-frequency resource; and sends the second uplink channel on the second time-frequency resource, where the first PUCCH resource group and the second PUCCH resource group are PUCCH resource groups configured for a same slot, the first uplink channel is used to carry a first HARQ-ACK scheduled by the first DCI, and the second uplink channel is used to carry a second HARQ-ACK scheduled by the second DCI.

It should be noted that the first DCI and the second DCI may be from a same network device, or may be from different network devices.

In a possible design, when the first time-frequency resource partially or fully overlaps the second time-frequency resource, the terminal device reselects, for the first uplink channel and/or the second uplink channel, a time-frequency resource used to carry sending of the first uplink channel and/or the second uplink channel.

In a possible implementation, when the first time-frequency resource partially or fully overlaps the second time-frequency resource, the terminal device reselects, for the first uplink channel and the second uplink channel, time-frequency resources used to carry sending of the first uplink channel and the second uplink channel. In this implementation, the terminal device may determine, in a preconfigured third PUCCH resource group, a third time-frequency resource used to send the first uplink channel, determine, in a preconfigured fourth PUCCH resource group, a fourth time-frequency resource used to send the second uplink channel, send the first uplink channel on the third time-frequency resource, and send the second uplink channel on the fourth time-frequency resource. In a possible design, no PUCCH resource in the third PUCCH resource group OFDM symbol has an OFDM symbol in common with any PUCCH resource in the fourth PUCCH resource group. In other words, a PUCCH resource in the third PUCCH resource group does not overlap a PUCCH resource in the fourth PUCCH resource group.

In a possible implementation, when the first time-frequency resource partially or fully overlaps the second time-frequency resource, the terminal device reselects, for the second uplink channel, a time-frequency resource used to carry sending of the second uplink channel. In this implementation, the terminal device may determine, in a preconfigured fifth PUCCH resource group, a fifth time-frequency resource used to send the second uplink channel, and send the second uplink channel on the fifth time-frequency resource. In a possible design, no PUCCH resource in the first PUCCH resource group has an OFDM symbol in common with any PUCCH resource in the fifth PUCCH resource group. In other words, a PUCCH resource in the first PUCCH resource group does not overlap a PUCCH resource in the fifth PUCCH resource group.

According to a fourth aspect, an embodiment of this application provides a terminal device. The terminal device has a function of implementing operations of the terminal device in the foregoing methods. The function may be implemented by hardware, or may be implemented by hardware executing corresponding software. The hardware or the software includes one or more modules or units corresponding to the foregoing function.

In a possible design, the terminal device includes an obtaining unit, a receiving unit, and a processing unit. These units can execute corresponding functions in the foregoing method example of the first aspect. For details, refer to the detailed descriptions in the method example. Details are not described herein again.

In another possible design, the terminal device includes a memory, a transceiver, a processor, and a bus, and the memory, the transceiver, and the processor are connected through the bus. The processor invokes an instruction stored in the memory, to perform the method in the first aspect.

According to a fifth aspect, an embodiment of this application provides a network device. The network device has a function of implementing operations of the network device in the foregoing methods. The function may be implemented by hardware, or may be implemented by hardware executing corresponding software. The hardware or the software includes one or more modules or units corresponding to the foregoing function.

In a possible design, the network device includes a sending unit. The sending unit can execute corresponding functions in the foregoing method example of the first aspect. For details, refer to the detailed descriptions in the method example. Details are not described herein again.

In another possible design, the network device includes a memory, a transceiver, and a bus, and the memory and the transceiver are connected through the bus. The transceiver may perform the method in the first aspect. For details, refer to the detailed descriptions in the method example. Details are not described herein again.

According to a sixth aspect, an embodiment of this application further provides a computer storage medium. The computer storage medium stores a computer-executable instruction, and when the computer-executable instruction is invoked by a computer, the computer is enabled to perform the method according to the first aspect or any possible design of the first aspect.

According to a seventh aspect, an embodiment of this application further provides a computer program product. The computer program product stores an instruction, and when the instruction is run on a computer, the computer is enabled to perform the method according to the first aspect or any possible design of the first aspect.

According to an eighth aspect, an embodiment of this application provides a chip system. The chip system includes a processor, and may further include a memory, and is configured to implement the method according to the first aspect or any possible design of the first aspect. The chip system may include a chip, or may include a chip and another discrete component.

DESCRIPTION OF EMBODIMENTS

Figure 1:
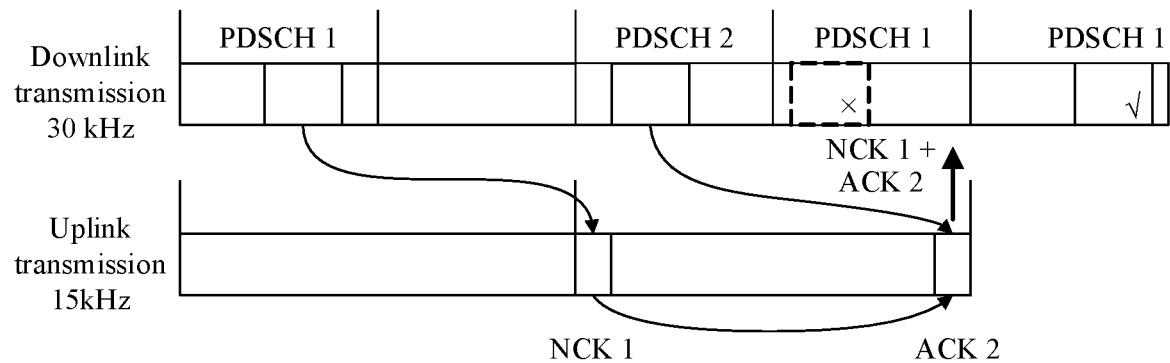
FIG. 1 is a schematic diagram of feeding back a HARQ-ACK.

To make objectives, technical solutions and advantages of the embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit (subscriber unit), a subscriber station, a mobile station, a mobile console, a remote station, an access point (AP), a remote terminal, an access terminal, a user terminal, a user agent, a user device, or the like. For example, the terminal device may include a mobile phone (or referred to as a "cellular" phone), a computer having a mobile terminal device, a portable, pocket-sized, handheld, computer built-in, or vehicle-mounted mobile apparatus, and a smart wearable device. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) A network device is a device in a wireless network. The network device may be a radio access network (RAN) node (or device) that enables a terminal device to access the wireless network, or may be referred to as a base station. Currently, examples of some network devices are a next-generation NodeB (gNB), a transmission reception point (TRP), an evolved NodeB (eNB), a NodeB (NB), a home evolved NodeB (for example, a home evolved NodeB or a home NodeB, HNB), a baseband unit (BBU), or a wireless fidelity (Wi-fi) access point (AP). In addition, in a network structure, the RAN may include a centralized unit (CU) node and a distributed unit (DU) node. In this structure, protocol layers of the base station are split. Functions of some protocol layers are centrally controlled by the CU, functions of some or all of remaining protocol layers are distributed in the DU, and the CU centrally controls the DU. A specific technology and a specific device form used by the base station are not limited in the embodiments of this application.

In addition, in the embodiments of this application, the network device provides a service for a cell. The terminal device communicates with the network device through a transmission resource (for example, a frequency domain resource or a spectrum resource) used in the cell. The cell may be a cell corresponding to the network device (for example, a base station). The cell may belong to a macro base station, or a base station corresponding to a small cell. The small cell herein may include a metro cell, a micro cell, a pico cell, a femto cell, or the like. The small cells have features such as small coverage and low transmit power, and are used to provide high-rate data transmission services.

(3) A subcarrier spacing is a value of a spacing between central locations or peak locations of two adjacent subcarriers in frequency domain in an orthogonal frequency division multiplexing (OFDM) system. For example, a subcarrier spacing in a long term evolution (LTE) system is 15 (kilohertz, kHz), and a subcarrier spacing in a next generation new radio (NR) system may be 15 kHz, 30 kHz, 60 kHz, 120 kHz, or the like.

For details, refer to Table 1. Table 1 shows subcarrier spacings that can be currently supported in the 5G NR system.

TABLE 1

| μ | Subcarrier spacing = $2^\mu \cdot 15$ (kHz) | CP type |
|---|---|---|
| 0 | 15 | Normal |
| 1 | 30 | Normal |
| 2 | 60 | Normal or extended |
| 3 | 120 | Normal |
| 4 | 240 | Normal |

μ is used to determine a subcarrier spacing. For example, when μ=0, the subcarrier spacing is 15 kHz; when μ=1, the subcarrier spacing is 30 kHz.

(4) URLLC service: The URLLC service has a very high requirement on a latency. A latency of unidirectional transmission from a transmit end to a receive end is required to be within 0.5 ms, and transmission reliability needs to reach 99.999% within 1 ms.

To meet the transmission latency requirement of the URLLC service, a shorter time scheduling unit may be used for data transmission over a radio air interface, for example, a mini-slot or a slot with a larger subcarrier spacing is used as a minimum time scheduling unit. One mini-slot includes one or more time domain symbols. The time domain symbol herein may be an orthogonal frequency division multiplexing OFDM symbol. One slot whose subcarrier spacing is 15 kHz includes 6 or 7 time domain symbols, and a corresponding time length is 0.5 ms. For one slot whose subcarrier spacing is 60 kHz, a corresponding time length is shortened to 0.125 ms.

Data of the URLLC services usually uses a relatively short time scheduling unit, to meet a requirement for an ultra-short latency. For example, two time domain symbols having a subcarrier spacing of 15 kHz or one slot having a subcarrier spacing of 60 kHz are used to correspond to 7 time domain symbols, and a corresponding time length is 0.125 ms.

To better quantize performance indicators of the URLLC service to provide a reference input and evaluation criterion for designing the 5G system, the performance indicators defined by the third generation partnership project (3GPP) working groups for the URLLC service include a latency and reliability.

Specifically, the latency is a transmission time that is required when an application layer data packet of a user reaches a radio protocol stack layer 2/3 service data unit (SDU) of a receive end from a radio protocol stack layer 2/3 SDU of a transmit end. When neither a network device nor a terminal device is in a discontinuous reception (DRX) state, a user plane latency requirement of the URLLC service is 0.5 ms in both uplink and downlink. It should be noted that a performance requirement of 0.5 ms herein means an average latency of data packets.

The reliability is a probability that X-bit data is correctly transmitted from the transmit end to the receive end within a specific time. The specific time is still defined as the time required when the application layer data packet of the user reaches the radio protocol stack layer 2/3 SDU of the receive end from the radio protocol stack layer 2/3 SDU of the transmit end. For the URLLC service, a typical requirement is that reliability of sending 32-bytes data within 1 ms reaches 99.999%. It should be noted that the foregoing performance indicators are merely typical values. A specific URLLC service may have a different requirement for reliability. For example, extremely stringent industrial control requires a transmission success probability of 99.9999999% within a 0.25 ms end-to-end latency.

(5) Start and length indicator value table: In this specification, a start and length indicator value may be referred to as an SLIV for short. Correspondingly, in this specification, the start and length indicator value table may be referred to as an SLIV table for short. The SLIV table may include a physical downlink shared channel (PDSCH) mapping type (PDSCH mapping type) and a demodulation reference signal (DMRS)-type A-position (dmrs-TypeA-Position), a slot offset $K_0$ from a slot in which a physical downlink control channel (PDCCH) is located to a slot in which an uplink channel of a PDSCH scheduled by the PDCCH is located, a start symbol S of the PDSCH in a slot, and a quantity L of symbols occupied by the PDSCH. One SLIV table may include at least one type of SLIV information, and each type of SLIV information has a corresponding number (that is, an SLIV index).

For example, referring to Table 2 that is Table 5.1.2.1.1-2 in the protocol NR R15 38.214 v 15.2.0, a row index in the table is an SLIV index, and the SLIV table and the SLIV indexes may be configured by using a higher-layer parameter or predefined. In the existing protocol, an SLIV index is carried in DCI on the PDCCH, and is used to indicate time domain resource allocation of a PDSCH scheduled by the DCI, that is, a combination of a start time domain symbol and a length of consecutive time domain symbols of the PDSCH.

TABLE 2

| Row index | Dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

(6) An uplink channel of hybrid automatic repeat request-acknowledgment (HARQ)-ACK may be understood as an uplink channel used to carry the HARQ-ACK, or may be described as an uplink channel corresponding to the HARQ-ACK.

(7) That a first parameter is related to DCI and may include a plurality of understandings. For example, one understanding is that the first parameter is included, carried, or born in the DCI, or one understanding is that the first parameter may be derived from a parameter carried in the DCI, or the first parameter is a parameter related to a PDCCH in which the DCI is located, or the first parameter is a parameter for scrambling the DCI. The following describes the two different understandings in detail, and details are not described herein.

(8) A HARQ-ACK corresponding to a PDSCH may also be described as a HARQ-ACK of the PDSCH and indicate that the HARQ-ACK is feedback information for the PDSCH. For example, the HARQ-ACK may include an acknowledgment (ACK) or a negative acknowledgment (NACK). When a terminal device correctly receives a PDSCH sent by a network device, the terminal device may feed back an ACK for the correctly received PDSCH. When the terminal device fails to correctly receive a PDSCH sent by the network device, the terminal device may feed back a NACK for the PDSCH that is not correctly received.

(9) PUCCH resource set: Currently, K ($1 \le K \le 4$) PUCCH resource sets are configured in the 5G NR system, and a value range of $N_{UCI}$, that is, the quantity of bits (payload size) corresponding to a PUCCH resource set n (n=0, 1, 2, 3) to carry an ACK/NACK is $N_n \le N_{UCI} \le N_{n+1}$. Currently, $N_0=1$ & $N_1=3$ are specified in the 5G NR system.

(10) A PUCCH resource group is a new concept proposed in this application. In this application, one PUCCH resource group may include one or more PUCCH resource sets. The PUCCH resource set may be defined in an existing protocol, or may be newly defined in this application. The following provides detailed examples for description, and details are not described herein.

(11) An eMBB PDSCH is a PDSCH corresponding to an eMBB service, or may be described as a PDSCH of an eMBB service. Similarly, a URLLC PDSCH is a PDSCH corresponding to a URLLC service, or may be described as a PDSCH of a URLLC service.

(12) A K1 value is a time unit offset from a time unit in which a PDSCH is located to a time unit in which an uplink channel of a HARQ-ACK corresponding to the PDSCH is located. In an existing protocol mechanism, a PDSCH-to-HARQ-timing-indicator field carried in DCI is used to indicate the K1 value. The field includes three bits, and a value of the field may range from "000" to "111". A specific K1 value indicated in one piece of DCI is configured by using RRC or is predefined.

(13) A first time length represents a time length corresponding to a K1 value, and may also be referred to as a unit of the K1 value or a granularity of the K1 value.

(14) A time unit in the embodiments of this application may be used to carry information. For example, one time unit may include one or more consecutive transmission time intervals (TTI), one or more consecutive slots, or one or more consecutive time domain symbols. The slot may be a full slot, or may be a mini-slot (or referred to as a non-slot). The mini-slot includes less than 14 orthogonal frequency division multiplexing (OFDM) symbols. One mini-slot may include 2, 3, 4, 5, 6, 7, 8, 9, 10, 11, 12, or 13 OFDM symbols. Different time units are used to carry different data packets or different repetitions (or referred to as repeated versions) of a same data packet.

(15) A time-frequency resource in the embodiments of this application is a general term of a time domain resource and a frequency domain resource. The time-frequency resource includes the time domain resource and the frequency domain resource, and the time-frequency resource may be used to carry signaling or data during communication between a terminal device and a network device. The time domain resource may be a resource in a time unit.

(16) "A plurality of" in the embodiments of this application means two or more than two. In view of this, "a plurality of" in the embodiments of this application may alternatively be understood as "at least two". "And/or" describes an association relationship between associated objects and represents that three relationships may exist. For example, A and/or B may represent three cases: There is only A, there are both A and B, and there is only B. In addition, the character "/" generally indicates an "or" relationship between the associated objects unless otherwise specified.

In the embodiments described in this application, "number" and "index" may be understood as a same concept, and both the "number" and the "index" are indexes in English. For example, an SLIV index may also be described as an SLIV number, and the two concepts may be interchanged.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects.

The following describes a technical background of the embodiments of this application.

In a 5G NR system, there is a scenario in which a URLLC service and an eMBB service coexist. The eMBB service is transmitted at a scheduling granularity of a slot, and the URLLC service is usually transmitted at a scheduling granularity of a mini-slot (for example, 2, 4, or 7 time domain symbols). If transmission granularities of the two services are different, a PUCCH carrying a HARQ-ACK corresponding to an eMBB PDSCH and a PUCCH carrying a HARQ-ACK corresponding to a URLLC PDSCH may need to be transmitted in one time unit (for example, a slot).

Currently, in the prior art, a HARQ-ACK may be determined in one slot. In other words, in the prior art, transmission of a plurality of physical uplink control channels (PUCCH) carrying HARQ-ACKs is not supported in one slot. That is, in the prior art, only one PUCCH carrying a HARQ-ACK can be transmitted in one slot. In the prior art, when HARQ-ACKs corresponding to a plurality of PDSCHs need to be transmitted in one slot, the plurality of HARQ-ACKs that need to be transmitted in one slot are jointly encoded into one HARQ-ACK codebook and the HARQ-ACK codebook is transmitted on one PUCCH. For example, as shown in FIG. 1, it is assumed that a terminal device needs to feed back HARQ-ACKs for different PDSCHs (a PDSCH 1 and a PDSCH 2) in one slot. The PDSCH 1 may be a URLLC PDSCH, and the PDSCH 2 may be an eMBB PDSCH. It is assumed that a HARQ-ACK that is fed back for the PDSCH 1 and that is determined by the terminal device is a HARQ-NACK 1, and a HARQ-ACK that is fed back for the PDSCH 2 is a HARQ-ACK 2. It is further assumed that a 30 kHz subcarrier spacing is used for downlink transmission, and a 15 kHz subcarrier spacing is used for uplink transmission. Limited by a data decoding capability of the terminal device, the HARQ-NACK 1 of the PDSCH 1 may be fed back at a start location of the second uplink slot at the earliest, and the HARQ-ACK 2 of the PDSCH 2 that is subsequently scheduled arrives at a relatively late moment, and may be fed back at an end location of the uplink slot at the earliest. Because an existing protocol restricts that only one uplink HARQ-ACK can be transmitted in one slot, for the foregoing example, by using the method in the prior art, the HARQ-NACK 1 needs to wait for a specific time and is fed back together with the HARQ-ACK 2. After the HARQ-ACK 2 is determined, the HARQ-NACK 1 and the HARQ-ACK 2 are combined into one HARQ-ACK to be carried in one PUCCH for feedback. In this way, transmission of the NACK 1 of the PDSCH 1 is delayed, and correspondingly, retransmission by a network device is also delayed. Because slot lengths for uplink and downlink transmission are inconsistent, a retransmission latency may exceed one downlink slot (for example, 1 ms). However, the URLLC service has a relatively high requirement (a 0.5 ms end-to-end latency) on a transmission latency. Therefore, the existing mechanism cannot meet the latency requirement required by the URLLC service.

In view of this, the embodiments of this application provide a communications method, apparatus, and device, to reduce a transmission latency of an uplink channel when uplink channels that carry a plurality of HARQ-ACKs are transmitted in one time unit.

The communications method provided in the embodiments of this application may be applied to a 5G NR system or an LTE system, or may be applied to a future mobile communications system, for example, a 6th generation mobile communications system. This is not limited in this application.

In addition, in the following description, an example in which the technical solutions provided in the embodiments of this application are applied to a URLLC service and an eMBB service is mainly used. This is not limited in actual application. For example, the technical solutions provided in the embodiments of this application may also be applied to other services.

Figure 2:
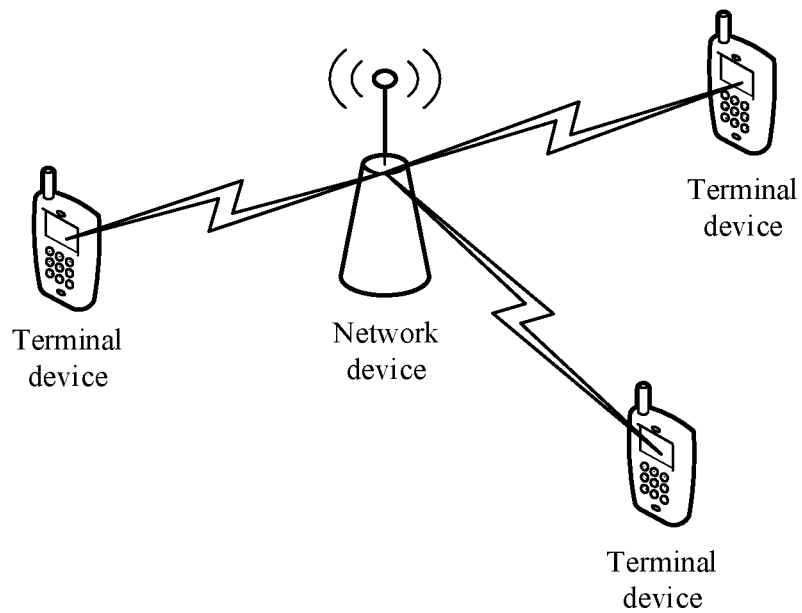
FIG. 2 is a schematic diagram of a network architecture to which an embodiment of this application is applied.

FIG. 2 is a schematic diagram of a network architecture to which an embodiment of this application is applied. As shown in FIG. 2, the network architecture includes a network device and at least one terminal device. The terminal device may be at a fixed location, or may be movable. The terminal device may be connected to the network device wirelessly. The network device may be, for example, a base station, and the terminal device may be, for example, UE. The network device and the terminal device may work in an NR system, and the terminal device may communicate with the network device through the NR system. FIG. 2 is merely a schematic diagram, and the mobile communications system may further include another network device, for example, may further include a wireless relay device and a wireless backhaul device that are not shown in FIG. 2. Quantities of network devices, and terminal devices included in the mobile communications system are not limited in the embodiments of this application.

Figure 3:
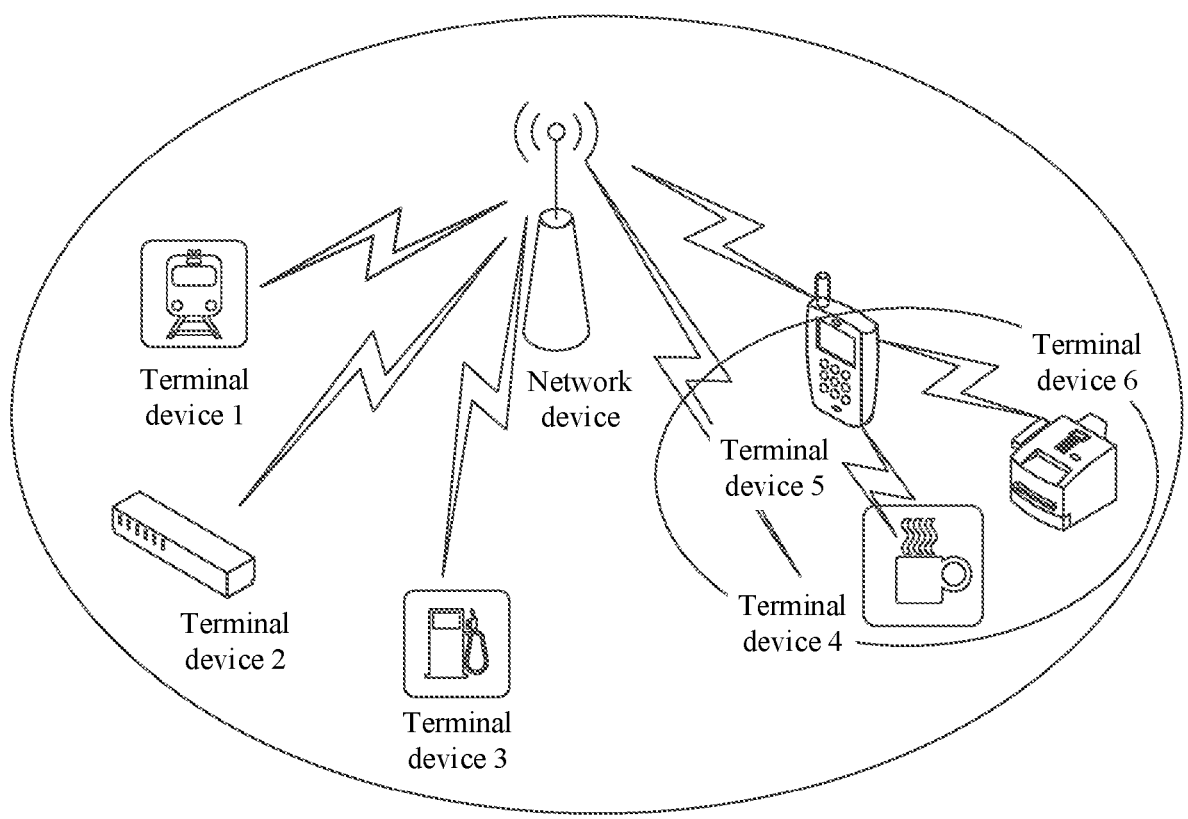
FIG. 3 is a schematic diagram of another network architecture to which an embodiment of this application is applied.

FIG. 3 is a schematic diagram of another network architecture to which an embodiment of this application is applied. As shown in FIG. 3, a network device and a terminal device 1 to a terminal device 6 form a wireless communications network. In the wireless communications network, the terminal device 1 to the terminal device 6 are used as entities for sending uplink data, and may transmit an uplink channel (the uplink channel may carry uplink data) to the network device. Certainly, the terminal device 1 to the terminal device 6 may also receive downlink data sent by the network device. In addition, the terminal device 4 to the terminal device 6 may also form a communications system. In the communications system, the network device may send downlink data to the terminal device 1, the terminal device 2, the terminal device 3, and the terminal device 5, and the terminal device 5 may also send downlink data to the terminal device 4 and the terminal device 6. It should be understood that an example in which the network architecture shown in FIG. 3 includes only one network device is used for description. However, the embodiments of this application are not limited thereto. For example, the network architecture may further include more network devices. Similarly, the network architecture may also include more terminal devices, and may further include another device, which is not shown in FIG. 3.

Figure 4:
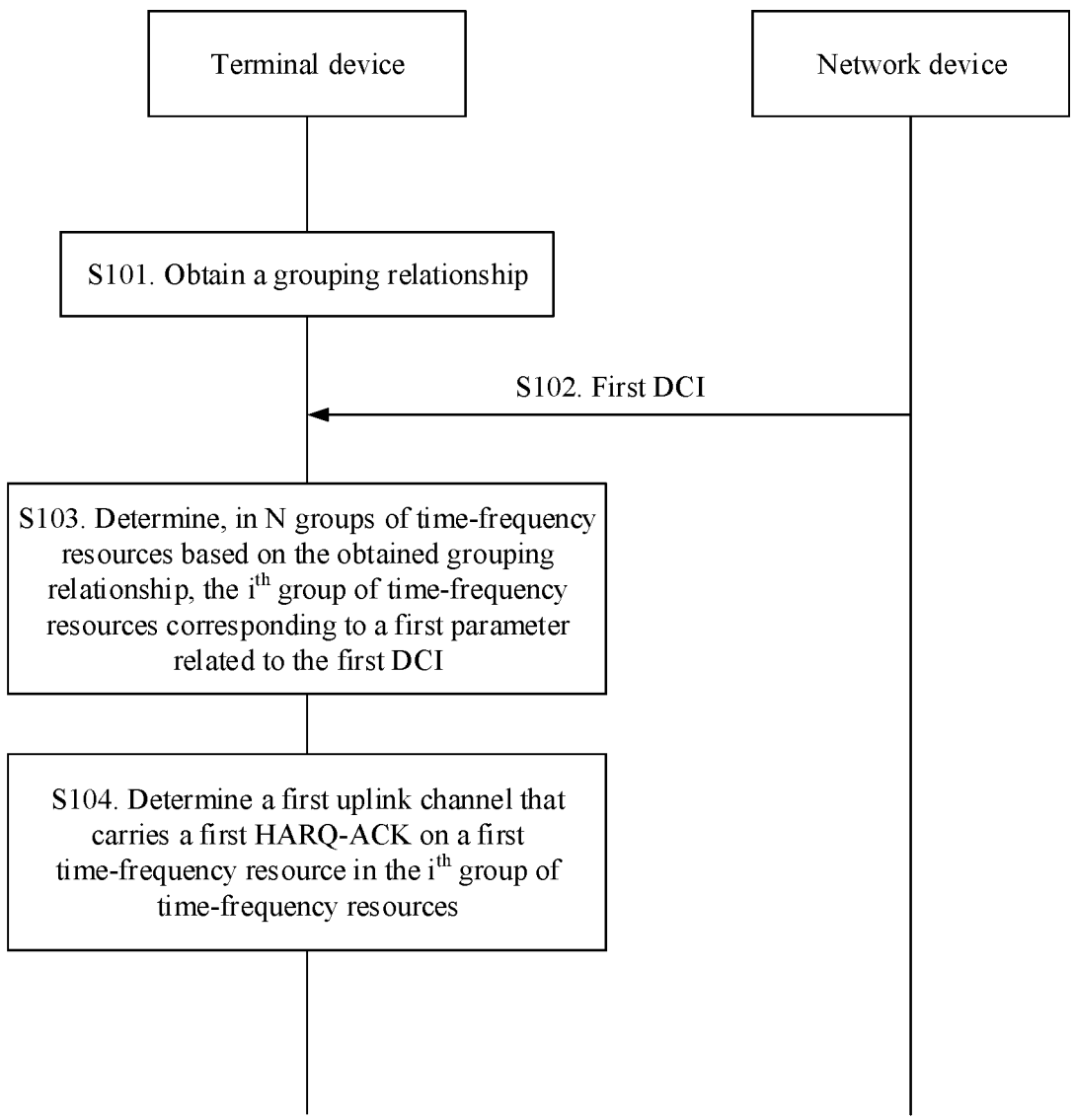
FIG. 4 shows a communications method according to an embodiment of this application.

Referring to FIG. 4, an embodiment of this application provides a communications method. In the following description, an example in which the method is applied to the application scenario shown in FIG. 2 is used. A procedure of the method is described as follows:

S101. A terminal device obtains a grouping relationship.

The grouping relationship represents a correspondence between a first parameter and N groups of time-frequency resources, the N groups of time-frequency resources are obtained by grouping time-frequency resources in one time unit, each group of time-frequency resources in the N groups of time-frequency resources corresponds to one or more first parameters, the first parameter is related to downlink control information (DCI), a time-frequency resource in each group of time-frequency resources is a time-frequency resource of an uplink channel that carries a HARQ-ACK, and N is a positive integer greater than or equal to 2. Each group of time-frequency resources may include one or more time-frequency resources.

In this embodiment of this application, the terminal device may receive the grouping relationship from a network device, or the terminal device locally obtains the grouping relationship. When the terminal device locally obtains the grouping relationship, the terminal device may locally prestore the grouping relationship. The grouping relationship may be obtained by the terminal device from the network device in advance, or may be preset. The following provides description by using an example in which the terminal device receives the grouping relationship from the network device.

The first parameter may include one or more of a K1 value (or written as a $K_1$ value), a first time length, a codebook identifier (codebook ID), a radio network temporary identifier (RNTI), an uplink channel end symbol, a PDCCH monitoring occasion, or an SLIV index. For example, the first parameter includes the K1 value and the first time length, or includes the K1 value and the radio network temporary identifier, or includes the K1 value and the SLIV index, or includes the K1 value and the PDCCH monitoring occasion, or includes the K1 value and the codebook identifier, or includes the codebook identifier and the uplink channel end symbol, or the like.

In this application, the K1 value is the quantity of time units offset from a time unit in which a physical downlink shared channel (PDSCH) is located to a time unit in which an uplink channel of a HARQ-ACK corresponding to the PDSCH is located. The first time length represents a time length corresponding to the K1 value. In this embodiment of this application, the first time length may include a first time unit length and a second time unit length. For example, the first time unit length is a slot, and the slot may include 14 time domain symbols. For example, the second time unit length is a mini-slot, and the mini-slot may include 2, 4, or 7 time domain symbols. Meanings of the K1 value and the first time length that are described below in this application are the same as those described herein. Details are not described.

It should be noted that, that the first parameter is related to the DCI in this application may include: The first parameter is carried in the DCI, or the first parameter may be derived from a parameter carried in the DCI, or the first parameter is a parameter related to a PDCCH in which the DCI is located, or the first parameter is a parameter used to scramble the DCI. For example, the first parameter carried in the DCI may include the K1 value, the SLIV index, and the codebook identifier. For another example, the first parameter that may be derived based on the parameter carried in the DCI may include the first time length derived based on the K1 value and the uplink channel end symbol that is derived based on an uplink channel time-frequency resource allocation parameter. For another example, the parameter related to the PDCCH in which the DCI is located may include the PDCCH monitoring occasion. For another example, the parameter used to scramble the DCI is the RNTI.

In this embodiment of this application, the uplink channel may include a physical uplink control channel (PUCCH) or a physical uplink shared channel (PUSCH).

It may be understood that the grouping relationship may be in a form of a list, or may be in another form. This is not limited in this application.

S102. The terminal device receives first DCI.

In FIG. 4, an example in which the terminal device receives the first DCI from the network device is used for illustration. A first parameter related to the first DCI corresponds to the $i^{th}$ group of time-frequency resources in the N groups of time-frequency resources, and i is a positive integer less than or equal to N.

S103. The terminal device determines, in the N groups of time-frequency resources based on the obtained grouping relationship, the $i^{th}$ group of time-frequency resources corresponding to the first parameter related to the first DCI.

S104. The terminal device determines a first uplink channel that carries a first HARQ-ACK on a first time-frequency resource in the $i^{th}$ group of time-frequency resources.

The first HARQ-ACK corresponds to a PDSCH scheduled by the first DCI. It may be understood that the first HARQ-ACK is feedback information for the PDSCH scheduled by the first DCI. The first HARQ-ACK may be an ACK or a NACK.

In this embodiment of this application, the first time-frequency resource may be some time-frequency resources in the $i^{th}$ group of time-frequency resources, or may be all time-frequency resources in the $i^{th}$ group of time-frequency resources. The following describes how the terminal device determines the first uplink channel that carries the first HARQ-ACK on the first time-frequency resource in the $i^{th}$ group of time-frequency resources.

In a possible implementation, the terminal device determines a corresponding PUCCH resource set based on the quantity of bits (payload size) of the first HARQ-ACK, and then determines, in the PUCCH resource set based on a PUCCH resource indicator (ARI) in the first DCI, the first time-frequency resource that carries the first uplink channel. For example, assuming that the ARI is "000", it may be determined that the resource carrying the first uplink channel is the $1^{st}$ PUCCH resource in the PUCCH resource set. In other words, the first time-frequency resource is the $1^{st}$ PUCCH resource in the PUCCH resource set.

In another possible implementation, the terminal device determines, in a PUCCH resource group configured via higher layer signaling, a corresponding PUCCH resource set based on the quantity of bits (payload size) of the first HARQ-ACK, and then determines, in the PUCCH resource set based on a PUCCH resource indicator in the first DCI, the first time-frequency resource that carries the first uplink channel.

It should be noted that, in this implementation, the PUCCH resource group is a new concept proposed in this application. Because quantities of bits of different HARQ-ACKs may differ greatly, in this application, different PUCCH resource groups may be configured for different quantities of bits of the HARQ-ACKs via higher layer signaling, and each PUCCH resource group includes one or more PUCCH resource sets.

According to the communications method provided in this embodiment of this application, time-frequency resources in one time unit are grouped into N groups of time-frequency resources, and each group of time-frequency resources in the N groups of time-frequency resources is available for transmitting an uplink channel that carries a HARQ-ACK. In other words, in comparison with the prior art in which one time unit can be used to transmit only one uplink channel that carries a HARQ-ACK, in the method provided in this embodiment of this application, one time unit is available for transmitting N uplink channels that carry HARQ-ACKs. In this way, when a plurality of uplink channels that carry HARQ-ACKs need to be transmitted in one time unit, an uplink channel that carries a HARQ-ACK and that needs to be sent earlier in time domain in the time unit does not need to be sent on a same PUCCH resource as a last uplink channel that carries a HARQ-ACK. In other words, according to the method in this application, a HARQ-ACK that arrives earlier can be sent earlier, to reduce a transmission latency and improve transmission efficiency.

In this embodiment of this application, if the grouping relationship is received by the terminal device from the network device, before the network device sends the grouping relationship to the terminal device, the network device may further determine the grouping relationship based on one or more of the following conditions:

condition 1: the K1 value, where the K value may be semi-statically configured or predefined;

condition 2: the first time length, where the first time length may be semi-statically configured or predefined;

condition 3: the SLIV index, where the SLIV index may be semi-statically configured or predefined, and in this embodiment of this application, an SLIV is an SLIV of a PDSCH corresponding to a HARQ-ACK;

condition 4: the codebook identifier, where the codebook identifier is used to indicate a group of time-frequency resources that carry a HARQ-ACK in the N groups of time-frequency resources, the codebook identifier may include N values, each value corresponds to a group of time-frequency resources in the N groups of time-frequency resources, and the codebook identifier may be carried in DCI.

condition 5: the RNTI, where the RNTI is used to scramble DCI;

condition 6: the uplink channel end symbol; and condition 7: the PDCCH monitoring occasion.

The following describes a process in which the network device determines the grouping relationship based on the K1 value. An example in which the K1 value is semi-statically configured is used for description.

When the K1 value is semi-statically configured, before the network device determines the grouping relationship based on the K1 value, the network device may further obtain several K1 values configured by a higher layer. For ease of description, the several K1 values are described as a K1 value set below. After obtaining the K1 value set configured by the higher layer, the network device may divide the K1 value set into N K1 value subsets, then may establish a one-to-one correspondence between the N K1 value subsets and the N groups of time-frequency resources, and determine the one-to-one correspondence between the N K1 subsets and the N groups of time-frequency resources as the grouping relationship.

Optionally, the network device may divide the K1 value set into the N subsets based on indexes (which may be understood as numbers) of the several K1 values.

For example, it is assumed that the indexes of the several K1 values are 1 to 8, and a corresponding K1 value set may be denoted as {1, 2, 3, 4, 5, 6, 7, 8}. N=2 is used as an example. The network device may divide the K1 value set {1, 2, 3, 4, 5, 6, 7, 8} into a first K1 value subset {1, 2, 3, 4} and a second K1 value subset {5, 6, 7, 8} based on the indexes of the K1 values. After dividing the K1 value set into the first K1 value subset and the second K1 value subset, the network device may establish a one-to-one correspondence between the two K1 value subsets and the two groups of time-frequency resources. For ease of description, the two groups of time-frequency resources are denoted as a first group of time-frequency resources and a second group of time-frequency resources below. For example, the network device may map the first K1 value subset to the first group of time-frequency resources, and map the second K1 value subset to the second group of time-frequency resources, to further determine a correspondence between the first K1 value subset and the first group of time-frequency resources and a correspondence between the second K1 value subset and the second group of time-frequency resources as the grouping relationship. In addition, in the foregoing example, the network device may alternatively divide the K1 value set {1, 2, 3, 4, 5, 6, 7, 8} into a first K1 value subset {1, 2, 3} and a second K1 value subset {4, 5, 6, 7, 8}. Certainly, the first K1 value subset and the second K value subset may alternatively be obtained through division in another manner. This is not limited in this application. In this example, the grouping relationship may be in a form of a list. Table 3 shows a possible form of the grouping relationship. In Table 3, the first parameter is the K1 value for illustration. When the K1 value ranges from 1 to 4, the K value corresponds to the first group of time-frequency resources. When the K1 value ranges from 5 to 8, the K1 value corresponds to the second group of time-frequency resources.

TABLE 3

| K1 value | N groups of time-frequency resources |
|---|---|
| 1 | First group of time-frequency resources |
| 2 | |
| 3 | |
| 4 | |
| 5 | Second group of time-frequency resources |
| 6 | |
| 7 | |
| 8 | |

For another example, it is assumed that the indexes of the several K1 values are 1 to 8, and a corresponding K1 value set may be denoted as {1, 2, 3, 4, 5, 6, 7, 8}. N=3 is used as an example. The network device may divide the K1 value set {1, 2, 3, 4, 5, 6, 7, 8} into a first K1 value subset {1, 2, 3}, a second K1 value subset {4, 5, 6}, and a third K value subset {7, 8} based on the indexes of the K1 values. After dividing the K1 value set into the first K1 value subset, the second K1 value subset, and the third K value subset, the network device may establish a one-to-one correspondence between the three K1 value subsets and the three groups of time-frequency resources. For ease of description, the three groups of time-frequency resources are denoted as a first group of time-frequency resources, a second group of time-frequency resources, and a third group of time-frequency resources below. For example, the network device may map the first K1 value subset to the first group of time-frequency resources, map the second K1 value subset to the second group of time-frequency resources, and map the third K1 value subset to the third group of time-frequency resources, to further determine the one-to-one correspondence between the three K1 value subsets and the three groups of time-frequency resources as the grouping relationship.

For still another example, it is assumed that the indexes of the several K1 values are 1 to 16, and a corresponding K1 value set may be denoted as {1, 2, 3, 4, 5, 6, 7, 8, 9, 10, 11, 12, 13, 14, 15, 16}. N=2 is used as an example. The network device may divide the K1 value set {1, 2, 3, 4, 5, 6, 7, 8, 9, 10, 11, 12, 13, 14, 15, 16} into a first K1 value subset {1, 2, 3, 4, 5, 6, 7, 8} and a second K1 value subset {9, 10, 11, 12, 13, 14, 15, 16} based on the indexes of the K1 values. For example, after dividing the K1 value set into the first K1 value subset and the second K1 value subset, the network device may map the first K1 value subset to a second group of time-frequency resources, and map the second K1 value subset to a first group of time-frequency resources, to further determine a correspondence between the first K1 value subset and the second group of time-frequency resources and a correspondence between the second K1 value subset and the first group of time-frequency resources as the grouping relationship.

In this embodiment of this application, if the network device determines the grouping relationship based on the K1 value, correspondingly, the terminal device may determine, in the N groups of time-frequency resources based on the obtained grouping relationship and the K1 value carried in the received first DCI, the $i^{th}$ group of time-frequency resources corresponding to the K1 value carried in the first DCI. The following describes an implementation.

For example, assuming that N is 2 and i is 1, the grouping relationship determined by the network device includes: The first K1 value subset {1, 2, 3, 4} corresponds to the first group of time-frequency resources, and the second K1 value subset {5, 6, 7, 8} corresponds to the second group of time-frequency resources. After determining the grouping relationship, the network device sends the grouping relationship to the terminal device, and sends the first DCI to the terminal device, where the K1 value carried in the first DCI is 3. After receiving the grouping relationship and the first DCI that are sent by the network device, the terminal device may learn that a K1 value 3 (which may also be described as the K1 value carried in the first DCI) related to the first DCI belongs to the first K1 value subset, and the first K1 value subset corresponds to the first group of time-frequency resources. Therefore, the terminal device may determine, in the two groups of time-frequency resources based on the grouping relationship, the first group of time-frequency resources corresponding to the K1 value 3 related to the first DCI, and may further determine the first uplink channel that carries the first HARQ-ACK on the first time-frequency resource in the first group of time-frequency resources.

It should be noted that when the K1 value is predefined, the network device may also determine the grouping relationship by using the foregoing method. A difference lies in that if the K1 value is predefined, the network device does not need to obtain the several K1 values configured by the higher layer, but directly performs the foregoing method by using the predefined K1 value.

The following describes a process in which the network device determines the grouping relationship based on the first time length. An example in which the first time length is semi-statically configured is used for description.

When the first time length is semi-statically configured, before the network device determines the grouping relationship based on the first time length, the network device may further obtain several first time lengths configured by a higher layer. For ease of description, the several first time lengths are described as a first time length set below. After obtaining the first time length set configured by the higher layer, the network device may divide the first time length set into N first time length subsets, then may establish a one-to-one correspondence between the N first time length subsets and the N groups of time-frequency resources, and determine the one-to-one correspondence between the N first time length subsets and the N groups of time-frequency resources as the grouping relationship.

For example, it is assumed that the several first time lengths obtained by the network device are 14 time domain symbols, 2 time domain symbols, 4 time domain symbols, and 7 time domain symbols, and a corresponding first time length set may be denoted as {2, 4, 7, 14}. N=2 is used as an example. The network device may divide the first time length set {2, 4, 7, 14} into a first time length subset {2, 4, 7} and a second time length subset {14} based on the first time lengths. After dividing the first time length set into the first time length subset and the second time length subset, the network device may establish a one-to-one correspondence between the two time length subsets and the two groups of time-frequency resources. For ease of description, the two groups of time-frequency resources are denoted as a first group of time-frequency resources and a second group of time-frequency resources below. For example, the network device may map the first time length subset {2, 4, 7} to the first group of time-frequency resources, and map the second time length subset {14} to the second group of time-frequency resources, to further determine a one-to-one correspondence between the two time length subsets and the two groups of time-frequency resources as the grouping relationship. In this example, the grouping relationship may be in a form of a list. Table 4 shows a possible form of the grouping relationship. In Table 4, the first parameter is the first time length for illustration. When the first time length is 2, 4, or 7, the first time length corresponds to the first group of time-frequency resources. When the K1 value ranges from 5 to 8, the first time length corresponds to the second group of time-frequency resources.

TABLE 4

| First time length | N groups of time-frequency resources |
|---|---|
| 2 | First group of time-frequency resources |
| 4 | |
| 7 | |
| 14 | Second group of time-frequency resources |

In this embodiment of this application, if the network device determines the grouping relationship based on the first time length, correspondingly, the terminal device may determine, in the N groups of time-frequency resources based on the obtained grouping relationship and the first time length, the $i^{th}$ group of time-frequency resources corresponding to the first time length related to the first DCI. The following describes an implementation.

For example, assuming that N is 2 and i is 1, the grouping relationship determined by the network device includes: the first time length subset {2 time domain symbols, 4 time domain symbols, 7 time domain symbols} corresponds to the first group of time-frequency resources, and the second time length subset {14 time domain symbols} corresponds to the second group of time-frequency resources. After determining the grouping relationship, the network device sends the grouping relationship to the terminal device, and sends the first DCI to the terminal device. It is assumed that the first time length corresponding to the first DCI is 7 time domain symbols. After receiving the grouping relationship and the first DCI that are sent by the network device, the terminal device may learn that the first time length that is 7 time domain symbols related to the first DCI belongs to the first time length subset, and may learn, based on the grouping relationship, that the first time length subset corresponds to the first group of time-frequency resources. Therefore, the terminal device may determine, in the two groups of time-frequency resources based on the grouping relationship, the first group of time-frequency resources corresponding to the first time length that is 7 time domain symbols related to the first DCI, and may further determine the first uplink channel that carries the first HARQ-ACK on the first time-frequency resource in the first group of time-frequency resources.

In this embodiment of this application, the foregoing description is provided by using an example in which the network device determines the grouping relationship based on the K1 value or the first time length. The network device may further determine the grouping relationship based on both the K1 value and the first time length. The following describes a method for determining the grouping relationship by the network device based on both the K1 value and the first time length.

In a possible implementation, the network device may configure, as a time length subset based on the first time length, K1 values corresponding to time lengths that are a same first time length. For example, it is assumed that several K1 values obtained by the network device from a higher layer are indexed by 1 to 8, and a corresponding K1 value set may be denoted as {1, 2, 3, 4, 5, 6, 7, 8}. A time length (that is, a granularity of the K1 value) corresponding to K1 values indexed by 1 to 4 is a ½ slot, and a time length (that is, a granularity of the K1 value) corresponding to K1 values indexed by 5 to 8 is a slot. The network device may configure, based on the first time length, the K1 values corresponding to the ½ slot as a first time length subset {1, 2, 3, 4}, and may configure, based on the first time length, the K1 values corresponding to the slot as a second time length subset {5, 6, 7, 8}, so that the first time length subset {1, 2, 3, 4} may correspond to the first group of time-frequency resources, and the second time length subset {5, 6, 7, 8} may correspond to the second group of time-frequency resources. A one-to-one correspondence between the two time length subsets and the two groups of time-frequency resources is determined as the grouping relationship.

It should be noted that when the first time length is predefined, the network device may also determine the grouping relationship by using the foregoing method. A difference lies in that if the first time length is predefined, the network device does not need to obtain the several first time lengths configured by the higher layer, but directly performs the foregoing method by using the predefined first time length.

The following describes a process in which the network device determines the grouping relationship based on the SLIV index. An example in which the SLIV index is semi-statically configured is used for description.

When the SLIV index is semi-statically configured, before the network device determines the grouping relationship based on the SLIV index, the network device may further obtain an SLIV table configured by a higher layer. The SLIV table may include a plurality of SLIV indices. For example, an SLIV table in an existing protocol includes a total of 16 SLIV indices: 1 to 16. For ease of description, the several SLIV indices are described as an SLIV index set below. After obtaining the SLIV table configured by the higher layer, the network device may determine the SLIV index set, further divide the SLIV index set into N SLIV index subsets, then establish a one-to-one correspondence between the N SLIV index subsets and the N groups of time-frequency resources, and determine the one-to-one correspondence between the N index subsets and the N groups of time-frequency resources as the grouping relationship.

For example, it is assumed that the several SLIV indices are 1 to 16, and a corresponding SLIV index set may be denoted as {1, 2, 3, 4, 5, 6, 7, 8, 9, 10, 11, 12, 13, 14, 15, 16}. N=2 is used as example. The network device may divide the SLIV index set {1, 2, 3, 4, 5, 6, 7, 8, 9, 10, 11, 12, 13, 14, 15, 16} into a first SLIV index subset {1, 2, 3, 4, 5, 6, 7, 8} and a second SLIV index subset {9, 10, 11, 12, 13, 14, 15, 16} based on the SLIV indices. After dividing the SLIV index set into the first SLIV index subset and the second SLIV index subset, the network device may establish a one-to-one correspondence between the two SLIV index subsets and the two groups of time-frequency resources. For ease of description, the two groups of time-frequency resources are denoted as a first group of time-frequency resources and a second group of time-frequency resources below. For example, the network device may map the first SLIV index subset to the first group of time-frequency resources, and map the second SLIV index subset to the second group of time-frequency resources, to further determine the one-to-one correspondence between the two SLIV index subsets and the two groups of time-frequency resources as the grouping relationship.

It should be noted that, in the foregoing example, an example in which the SLIV indices included in the SLIV index set are equally divided into the N subsets is used for illustration. In this application, alternatively, the network device may unequally divide the SLIV indices included in the SLIV index set into the N subsets. The following describes an example.

For example, it is assumed that the several SLIV indices are 1 to 16, and a corresponding SLIV index set may be denoted as {1, 2, 3, 4, 5, 6, 7, 8, 9, 10, 11, 12, 13, 14, 15, 16}. N=2 is used as an example. The network device may unequally divide the SLIV index set {1, 2, 3, 4, 5, 6, 7, 8, 9, 10, 11, 12, 13, 14, 15, 16} into a first SLIV index subset {1, 2, 3, 4, 8, 12, 15} and a second SLIV index subset {5, 6, 7, 9, 10, 11, 13, 14, 16}. After dividing the SLIV index set into the SLIV index subsets, the network device may establish a one-to-one correspondence between the two SLIV index subsets and the two groups of time-frequency resources, for example, may map the first SLIV index subset to the first group of time-frequency resources, and map the second SLIV index subset to the second group of time-frequency resources.

For another example, it is assumed that the several SLIV indices are 1 to 16, and a corresponding SLIV index set may be denoted as {1, 2, 3, 4, 5, 6, 7, 8, 9, 10, 11, 12, 13, 14, 15, 16}. N=3 is used as an example. The network device may unequally divide the SLIV index set {1, 2, 3, 4, 5, 6, 7, 8, 9, 10, 11, 12, 13, 14, 15, 16} into a first SLIV index subset {1, 2, 3, 4, 8, 12, 15}, a second SLIV index subset {5, 6, 7, 13, 14, 16}, and a third SLIV index subset {9, 10, 11}. After dividing the SLIV index set into the SLIV index subsets, the network device may establish a one-to-one correspondence between the three SLIV index subsets and the three groups of time-frequency resources, for example, may map the first SLIV index subset to the first group of time-frequency resources, map the second SLIV index subset to the second group of time-frequency resources, and map the third SLIV index subset to the third group of time-frequency resources.

For still another example, it is assumed that the several SLIV indices are 1 to 16, and a corresponding SLIV index set may be denoted as {1, 2, 3, 4, 5, 6, 7, 8, 9, 10, 15, 12, 13, 14, 14, 16, 16}. N=4 is used as an example. The network device may unequally divide the SLIV index set {1, 2, 3, 4, 5, 6, 7, 8, 9, 10, 11, 12, 13, 14, 15, 16} into a first SLIV index subset {1, 2, 3, 12}, a second SLIV index subset {5, 6, 7, 13, 14, 16}, a third SLIV index subset {9, 10, 11}, and a fourth SLIV index subset {4, 8, 15}. After dividing the SLIV index set into the SLIV index subsets, the network device may establish a one-to-one correspondence between the four SLIV index subsets and the four groups of time-frequency resources, for example, may map the first SLIV index subset to the first group of time-frequency resources, map the second SLIV index subset to the second group of time-frequency resources, map the third SLIV index subset to the third group of time-frequency resources, and map the fourth SLIV index subset to the fourth group of time-frequency resources.

In this embodiment of this application, if the network device determines the grouping relationship based on the SLIV index, correspondingly, the terminal device may determine, in the N groups of time-frequency resources based on the obtained grouping relationship and the SLIV index, the $i^{th}$ group of time-frequency resources corresponding to the SLIV index related to the first DCI. The following describes an implementation.

For example, assuming that N is 2 and i is 1, the grouping relationship determined by the network device includes: A first SLIV index subset {1, 2, 3, 4, 5, 6, 7, 8} corresponds to a first group of time-frequency resources, and a second SLIV index subset {9, 10, 11, 12, 13, 14, 15, 16} corresponds to a second group of time-frequency resources. After determining the grouping relationship, the network device sends the grouping relationship to the terminal device, and then may send the first DCI to the terminal device. It is assumed that the SLIV index carried in the first DCI is 8. After receiving the grouping relationship and the first DCI that are sent by the network device, the terminal device may learn that the SLIV index 8 related to the first DCI belongs to the first SLIV index subset, and may learn, based on the grouping relationship, that the first SLIV index subset corresponds to the first group of time-frequency resources. Therefore, the terminal device may determine, in the two groups of time-frequency resources based on the grouping relationship, the first group of time-frequency resources corresponding to the SLIV index related to the first DCI, and may further determine the first uplink channel that carries the first HARQ-ACK on the first time-frequency resource in the first group of time-frequency resources.

In a possible implementation, the SLIV indices may be some SLIV indices included in the SLIV table. In this implementation, the network device may equally or unequally divide the some SLIV indices into the N SLIV index subsets, and establish a one-to-one correspondence between the N SLIV index subsets and the N groups of time-frequency resources.

In still another possible implementation, all PUCCHs are piggybacked on a PUSCH. In this implementation, the network device may determine the grouping relationship based on SLIV indices corresponding to the PUSCHs. For a specific implementation, refer to the method for determining the grouping relationship based on the SLIV indices corresponding to the PDSCHs. Details are not described herein again.

The following describes a process in which the network device determines the grouping relationship based on the codebook identifier.

In a possible implementation, there may be N values of the codebook identifier, and each value corresponds to one group of time-frequency resources in the N groups of time-frequency resources. N=2 is used as an example. Values of the codebook identifier may include 0 and 1. The network device may map a value 0 to a first group of time-frequency resources in the two groups of time-frequency resources, and map a value 1 to a second group of time-frequency resources in the two groups of time-frequency resources. In this way, the network device may establish a one-to-one correspondence between the two values of the codebook identifier and the two groups of time-frequency resources. The terminal device may determine, in the N groups of time-frequency resources based on the value of the codebook identifier carried in the received DCI, a group of time-frequency resources corresponding to the value of the codebook identifier.

The following describes a process in which the network device determines the grouping relationship based on the RNTI.

Optionally, the network device may determine the grouping relationship based on a type of the RNTI.

For example, it is assumed that there are three types of RNTIs: a C-RNTI, a CS-RNTI, and an MCS-C-RNTI. N=3 is used as an example. The network device may map the C-RNTI to a first group of time-frequency resources in the three groups of time-frequency resources, map the CS-RNTI to a second group of time-frequency resources in the three groups of time-frequency resources, and map the MCS-C-RNTI to a third group of time-frequency resources in the three groups of time-frequency resources. In this way, the network device may establish a one-to-one correspondence between the three types of RNTIs and the three groups of time-frequency resources. The terminal device may derive, based on the received DCI, a RNTI scrambling type used for the DCI, and then may determine, in the N groups of time-frequency resources based on the RNTI scrambling type used for the DCI, a group of time-frequency resources of an uplink channel that carries a HARQ-ACK of a PDSCH scheduled by the DCI.

It should be noted that the MCS-C-RNTI is a new RNTI provided in this application, and has the following function: It may be determined, by using the MCS-C-RNTI, that data of a PDSCH corresponding to a HARQ-ACK is from a first-type service, where the first-type service may be, for example, a URLLC service. The MCS-C-RNTI represents only a possible name, or may be described as an X-RNTI. A name is not limited in this application, and is to distinguish between an RNTI having the foregoing function and an existing RNTI. The existing RNTI may include, for example, the C-RNTI, the CS-RNTI, a P-RNTI, or an SI-RNTI.

The following describes a process in which the network device determines the grouping relationship based on the PDCCH monitoring occasion.

Optionally, the network device may divide several PDCCH monitoring occasions into N subsets based on the several PDCCH monitoring occasions. For ease of description, the several PDCCH monitoring occasions are referred to as a PDCCH monitoring occasion set. For example, it is assumed that the several PDCCH monitoring occasions include symbols 0, 2, 4, 6, 8, 10, and 12 in a slot, and correspondingly, this may be understood as: the PDCCH monitoring occasion set is $\{0, 2, 4, 6, 8, 10, 12\}$. N=2 is used as an example. The network device may divide the PDCCH monitoring occasion set $\{0, 2, 4, 6, 8, 10, 12\}$ into a first PDCCH monitoring occasion subset $\{0, 2, 4, 6\}$, and a second PDCCH monitoring occasion subset $\{8, 10, 12\}$. After dividing the PDCCH monitoring occasion set into the first PDCCH monitoring occasion subset and the second PDCCH monitoring occasion subset, the network device may establish a one-to-one correspondence between the two PDCCH monitoring occasion subsets and the two groups of time-frequency resources. For example, the network device may map the first PDCCH monitoring occasion subset to the first group of time-frequency resources, and map the second PDCCH monitoring occasion subset to the second group of time-frequency resources.

The following describes a process in which the network device determines the grouping relationship based on the uplink channel end symbol.

Before determining the grouping relationship based on the uplink channel end symbol, the network device may further obtain several start control channel element (CCE) indices configured by a higher layer. For example, the indices may be described as a CCE index set. After obtaining the CCE index set configured by the higher layer, the network device may divide the CCE index set into N CCE index subsets, and each CCE index subset may correspond to a group of uplink channel end symbols. In this way, the network device may establish a one-to-one correspondence between the N groups of uplink channel end symbols and the N groups of time-frequency resources, and further determine the one-to-one correspondence between the N groups of uplink channel end symbols and the N groups of time-frequency resources as the grouping relationship.

Each CCE index subset may correspond to an uplink channel end symbol in a range. For example, it is assumed that there are two CCE index subsets. One CCE index subset may correspond to an uplink channel end symbol in a symbol range of 2 to 7, and the other CCE index subset may correspond to an uplink channel end symbol in a symbol range of 8 to 13.

Optionally, the network device may divide the CCE index set into the N subsets based on values of the CCE indices.

For example, it assumed that the values of the several CCE indices range from 1 to 8, and a corresponding CCE index set may be denoted as $\{1, 2, 3, 4, 5, 6, 7, 8\}$. N=4 is used as an example. The network device may divide the CCE index set $\{1, 2, 3, 4, 5, 6, 7, 8\}$ into a first CCE index subset $\{1, 2\}$, a second CCE index subset $\{3, 4, 5\}$, a third CCE index subset $\{6, 7\}$, and a fourth CCE index subset $\{8\}$. After dividing the CCE index set into the CCE index subsets, the network device may determine a group of uplink channel end symbols corresponding to each CCE index subset. It is assumed that a first group of uplink channel end symbols corresponding to the first CCE index subset $\{1, 2, 3\}$ is $\{3, 4, 6\}$, a second group of uplink channel end symbols corresponding to the second CCE index subset $\{3, 4, 5\}$ is $\{7, 13\}$, a third group of uplink channel end symbols corresponding to the third CCE index subset $\{6, 7\}$ is $\{10\}$, and a fourth group of uplink channel end symbols corresponding to the fourth CCE index subset $\{8\}$ is $\{7\}$. Further, the network device may establish a one-to-one correspondence between the four groups of uplink channel end symbols and the four groups of time-frequency resources. For ease of description, the four groups of time-frequency resources are denoted as a first group of time-frequency resources, a second group of time-frequency resources, a third group of time-frequency resources, and a fourth group of time-frequency resources. For example, the network device may map the first group of uplink channel end symbols to the first group of time-frequency resources, map the second group of uplink channel end symbols to the second group of time-frequency resources, map the third group of uplink channel end symbols to the third group of time-frequency resources, and map the fourth group of uplink channel end symbols to the fourth group of time-frequency resources, so that the one-to-one correspondence between the four groups of uplink channel end symbols and the four groups of time-frequency resources can be determined as the grouping relationship.

Figure 5A:
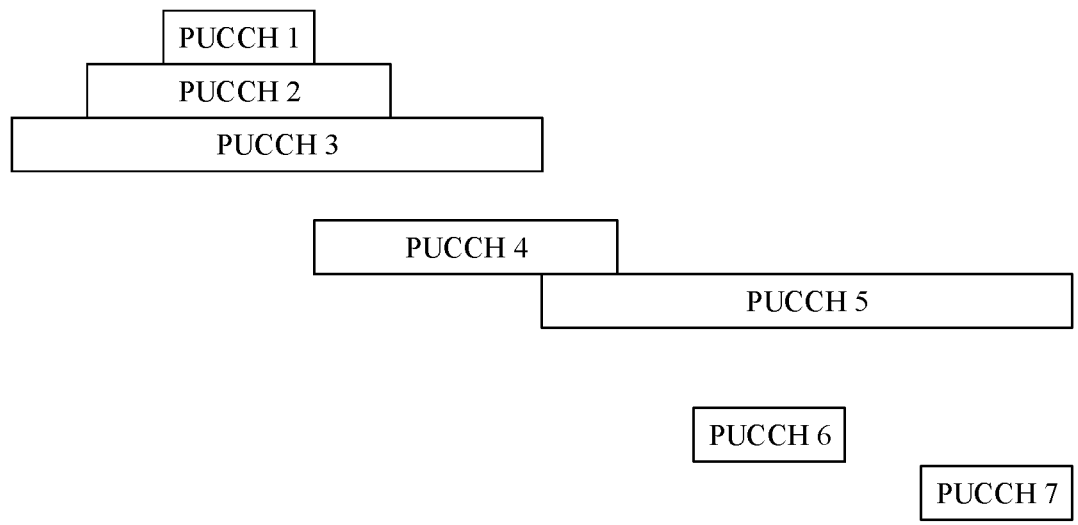
FIG. 5(a) is a schematic diagram of time unit grouping according to an embodiment of this application.

For another example, FIG. 5(a) is a schematic diagram of time unit grouping according to an embodiment of this application. In FIG. 5(a), it is assumed that a time unit is a slot, N is 4, and an uplink channel is a PUCCH. It is assumed that HARQ-ACKs corresponding to seven PDSCHs need to be transmitted in a slot n, one PUCCH carries a HARQ-ACK for one PDSCH, and time domain resources used to transmit PUCCHs are selected based on quantities of bits of the HARQ-ACKs, to obtain a PUCCH 1 to a PUCCH 7. Grouping is determined based on an end symbol of one PUCCH. There may be start symbols of several PUCCHs before the end symbol, and these PUCCHs overlap in time domain. In FIG. 5(a), there are start symbols of the PUCCH 2 and the PUCCH 3 before a last symbol of the PUCCH 1. In this case, the PUCCHs 1 to 3 are grouped into one group, and correspond to a first group of time-frequency resources. There is only a start symbol of the PUCCH 5 before an end symbol of the PUCCH 4. In this case, resources occupied by the PUCCH 4 and the PUCCH 5 correspond to a second group of time-frequency resources. There is no start symbol of another PUCCH before an end symbol of the PUCCH 6, and the PUCCH 6 is independently grouped into one group and corresponds to a third group of time-frequency resources. Similarly, the PUCCH 7 corresponds to a fourth group of time-frequency resources. Therefore, the network device may determine a one-to-one correspondence between the four groups of uplink channel end symbols and the four groups of time-frequency resources as the grouping relationship.

In this embodiment of this application, the foregoing describes the method for determining the grouping relationship by the network device based on one condition. In addition, the network device may further determine the grouping relationship based on a combination of two conditions. The following describes an example in which the network device determines the grouping relationship based on two conditions.

For example, an example in which the network device determines the grouping relationship based on the first time length and the RNTI is used for description. It is assumed that several first time lengths obtained by the network device are 14 time domain symbols, 2 time domain symbols, 4 time domain symbols, and 7 time domain symbols, and a corresponding first time length set may be denoted as {2, 4, 7, 14}. The network device may divide the first time length set {2, 4, 7, 14} into a first time length subset {2, 4, 7} and a second time length subset {14} based on the first time lengths. Further, it is assumed that there are three types of RNTIs: a C-RNTI, a CS-RNTI, and an MCS-C-RNTI. N=4 is used as an example. To be specific, time-frequency resources in one time unit are grouped into four groups of time-frequency resources, which are denoted as a first group of time-frequency resources, a second group of time-frequency resources, a third group of time-frequency resources, and a fourth group of time-frequency resources. That the network device groups the resources in the time unit based on a combination of the first time length and the RNTI may include: The network device maps the first time length {2, 4, 7} and DCI scrambled with the MCS-C-RNTI to the first group of time-frequency resources, maps the first time length {2, 4, 7} and DCI scrambled with the C-RNTI and the CS-RNTI to the second group of time-frequency resources, maps the first time length 14 and DCI scrambled with the MCS-C-RNTI to the third group of time-frequency resources, and maps the first time length {2, 4, 7} and DCI scrambled with the C-RNTI and the CS-RNTI to the fourth group of time-frequency resources. The network device may further determine the four groups of correspondences as the grouping relationship.

For another example, an example in which the network device determines the grouping relationship based on the K1 value and the RNTI is used for description. It is assumed that several K1 values obtained by the network device are 1, 2, 3, 4, 5, 6, 7, or 8, and a corresponding K1 value set may be denoted as {1, 2, 3, 4, 5, 6, 7, 8}. The network device may divide the K1 value set {1, 2, 3, 4, 5, 6, 7, 8} into a first K1 value subset {1, 2, 3, 4} and a second K1 value subset {5, 6, 7, 8} based on the K1 values. Further, it is assumed that there are three types of RNTIs: a C-RNTI, a CS-RNTI, and an MCS-C-RNTI. N=3 is used as an example. To be specific, time-frequency resources in one time unit are grouped into three groups of time-frequency resources, which are denoted as a first group of time-frequency resources, a second group of time-frequency resources, and a third group of time-frequency resources. That the network device groups the resources in the time unit based on a combination of the K1 value and the RNTI may include: The network device maps the K1 values {5, 6, 7, 8} and DCI scrambled with the MCS-C-RNTI to the first group of time-frequency resources, maps the K1 values {1, 2, 3, 4} and DCI scrambled with the C-RNTI and the CS-RNTI to the second group of time-frequency resources, and maps the K1 values {1, 2, 3, 4} and DCI scrambled with the MCS-C-RNTI to the third group of time-frequency resources. The network device may further determine the three groups of correspondences as the grouping relationship.

It may be understood that the foregoing examples are merely examples for description. The network device may alternatively determine the grouping relationship based on another condition combination. For details, refer to the foregoing methods for determining the grouping relationship based on a single condition. Details are not described herein again.

In addition, the network device may further determine the grouping relationship based on more than two of the foregoing conditions. For details, refer to the foregoing methods for determining the grouping relationship based on a single condition. Details are not described herein again.

In this embodiment of this application, before determining the grouping relationship according to the foregoing method, the network device may further obtain a parameter N configured by a higher layer. In other words, the quantity of groups into which the network device groups time-frequency resources in one time unit may be configured by the higher layer.

Figure 5B:
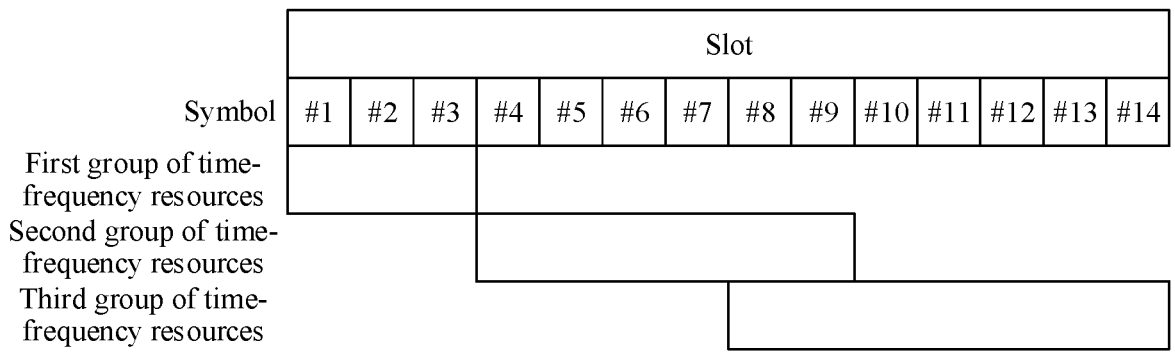
FIG. 5(b) is a schematic diagram of another time unit grouping according to an embodiment of this application.

It may be understood that, in this application, N groups of time-frequency resources obtained by grouping time-frequency resources in one time unit may overlap or may not overlap. Overlapping may be partial or complete overlapping. FIG. 5(b) is a schematic diagram of time unit grouping according to an embodiment of this application. In FIG. 5(b), it is assumed that a time unit is a slot, and N is 3. In other words, in FIG. 5(b), an example in which time-frequency resources in one slot are grouped into three groups of time-frequency resources is used for illustration. As shown in FIG. 5(b), a first group of time-frequency resources occupies time-frequency resources in symbols 1 to 3 in the slot, a second group of time-frequency resources occupies time-frequency resources in symbols 4 to 9 in the slot, and a third group of time-frequency resources occupies time-frequency resources in symbols 8 to 14 in the slot. The first group of time-frequency resources does not overlap the second group of time-frequency resources, the first group of time-frequency resources does not overlap the third group of time-frequency resources, and the second group of time-frequency resources overlaps the third group of time-frequency resources.

The foregoing mainly describes how the network device determines the grouping relationship. The following describes in detail how the terminal device implements the communications method provided in this application.

It may be understood that the quantity of pieces of DCI received by the terminal device is not limited in this application. The method embodiment corresponding to FIG. 4 mainly describes how the terminal device performs the method provided in this application when the terminal device receives one piece of DCI. The following further describes the method provided in this embodiment of this application by using an example in which the terminal device receives two pieces of DCI. Certainly, the terminal device may alternatively receive more than two pieces of DCI. An implementation principle is similar. In this application, the following uses an example in which the terminal device receives two pieces of DCI.

In a possible implementation, the terminal device may receive second DCI in addition to the first DCI. After receiving the second DCI, the terminal device may determine, in the N groups of time-frequency resources based on the obtained grouping relationship, a time-frequency resource corresponding to a first parameter related to the second DCI. In a possible case, both the first parameter corresponding to the second DCI and the first parameter corresponding to the first DCI correspond to the $i^{th}$ group of time-frequency resources in the N groups of time-frequency resources. In another possible case, the first parameter corresponding to the second DCI corresponds to the $k^{th}$ group of time-frequency resources in the N groups of time-frequency resources, where k is a positive integer less than or equal to N, and k and i are different values. The following separately describes the two possible cases.

In the first case, both the first parameter corresponding to the second DCI and the first parameter corresponding to the first DCI correspond to the $i^{th}$ group of time-frequency resources in the N groups of time-frequency resources. The terminal device may combine the first HARQ-ACK corresponding to the PDSCH scheduled by the first DCI and a second HARQ-ACK corresponding to a PDSCH scheduled by the second DCI into one hybrid HARQ-ACK, and transmit, on the $i^{th}$ group of time-frequency resources, an uplink channel that carries the hybrid HARQ-ACK.

In the second case, the first parameter corresponding to the second DCI corresponds to the $k^{th}$ group of time-frequency resources in the N groups of time-frequency resources, and the first parameter corresponding to the first DCI corresponds to the $i^{th}$ group of time-frequency resources in the N groups of time-frequency resources. The terminal device may determine a second uplink channel that carries a second HARQ-ACK on a second time-frequency resource in the $k^{th}$ group of time-frequency resources.

In the foregoing second case, the first time-frequency resource may overlap or may not overlap the second time-frequency resource. The following separately describes a case in which the first time-frequency resource overlaps the second time-frequency resource and a case in which the first time-frequency resource does not overlap the second time-frequency resource.

In a possible implementation, the first time-frequency resource does not overlap the second time-frequency resource. For example, FIG. 5(b) is used as an example for illustration. It is assumed that N is 3, i is 1, and k is 2. The $i^{th}$ group of time-frequency resources corresponds to the first group of time-frequency resources in FIG. 5(b), the $k^{th}$ group of time-frequency resources corresponds to the second group of time-frequency resources in FIG. 5(b), and the first group of time-frequency resources does not overlap the second group of time-frequency resources in FIG. 5(b). The first time-frequency resource is a time-frequency resource in the first group of time-frequency resources, and the second time-frequency resource is a time-frequency resource in the second group of time-frequency resources. Therefore, the first time-frequency resource does not overlap the second time-frequency resource in FIG. 5(b). In this implementation, the terminal device sends the first uplink channel on the first time domain resource, and sends the second uplink channel on the second time domain resource. In this way, the terminal device may transmit, respectively on the two different groups of time-frequency resources in the N groups of time-frequency resources, the first uplink channel that carries the first HARQ-ACK and the second uplink channel that carries the second HARQ-ACK. The first uplink channel and the second uplink channel do not need to be sent on a same PUCCH resource, and a HARQ-ACK that arrives earlier in the first HARQ-ACK and the second HARQ-ACK may be fed back earlier. This can reduce a transmission latency to some extent.

In another possible implementation, the first time-frequency resource partially or fully overlaps the second time-frequency resource. For example, FIG. 5(b) is used as an example for illustration. It is assumed that N is 3, i is 2, and k is 3. The $i^{th}$ group of time-frequency resources corresponds to the second group of time-frequency resources in FIG. 5(b), the $k^{th}$ group of time-frequency resources corresponds to the third group of time-frequency resources in FIG. 5(b), and the second group of time-frequency resources partially overlaps the third group of time-frequency resources in FIG. 5(b). If the first time-frequency resource determined by the terminal device is symbols 7 to 9 in the second group of time-frequency resources, and the determined second time-frequency resource is symbols 8 to 11 in the third group of time-frequency resources, the first time-frequency resource partially overlaps the second time-frequency resource. If the first time-frequency resource determined by the terminal device is symbols 8 and 9 in the second group of time-frequency resources, and the determined second time-frequency resource is symbols 8 and 9 in the third group of time-frequency resources, the first time-frequency resource fully overlaps the second time-frequency resource. In this implementation, because only one PUCCH is allowed to be transmitted on the overlapping resources, the terminal device needs to reselect a resource regardless of whether the first time-frequency resource partially or fully overlaps the second time-frequency resource. In this application, the terminal device may reselect a resource in the following manner: The terminal device combines the first HARQ-ACK and the second HARQ-ACK into a third HARQ-ACK, and determines a third uplink channel that carries the third HARQ-ACK on a third time-frequency resource, where the third time-frequency resource is a time-frequency resource in a group of time-frequency resources included in the N groups of time-frequency resources. In this application, before determining the third uplink channel that carries the third HARQ-ACK on the third time-frequency resource, the terminal device may further determine the third time-frequency resource. The following provides two methods for determining the third time-frequency resource.

In a possible implementation, the terminal device selects a group of time-frequency resources from the $i^{th}$ group of time-frequency resources or the $k^{th}$ group of time-frequency resources, and determines the third time-frequency resource in the group of time-frequency resources. The following provides description by using an example in which the terminal device determines the third time-frequency resource in the $i^{th}$ group of time-frequency resources.

The terminal device may determine the third time-frequency resource in the $i^{th}$ group of time-frequency resources when determining that the first uplink channel meets one or more of the following conditions.

Condition 1: A first time length corresponding to the first uplink channel is shorter than a first time length corresponding to the second uplink channel. It may be understood that when a plurality of time-frequency resources overlap, the terminal device may determine the third time-frequency resource in the $i^{th}$ group of time-frequency resources when determining that the first time length corresponding to the first uplink channel is a smallest first time length or is one of smallest first time lengths.

Condition 2: The first uplink channel is an uplink channel corresponding to DCI scrambled by a first RNTI. The first RNTI is a new RNTI provided in this application, and has the following function: It may be determined, by using the first RNTI, that data of a PDSCH corresponding to a HARQ-ACK is from a first-type service, where the first-type service may be, for example, a URLLC service.

Condition 3: The first uplink channel is an uplink channel carried on a time-frequency resource determined based on the K1 value or the SLIV index.

In a possible implementation, it is assumed that the first uplink channel is a PUCCH. The terminal device may determine the third time-frequency resource in the $i^{th}$ group of time-frequency resources by using the following method: The terminal device determines, in a first PUCCH resource group, a first PUCCH resource set corresponding to the quantity of bits of the third HARQ-ACK, where the first PUCCH resource group corresponds to a PUCCH transmitted on the $i^{th}$ group of time-frequency resources, and the first PUCCH resource group includes one or more PUCCH resource sets. The terminal device may determine the third time-frequency resource in the first PUCCH resource set after determining the first PUCCH resource set. For example, the terminal device may determine, in the first PUCCH resource set based on a resource indicator value of a third PUCCH, the third time-frequency resource that carries a third HARQ-ACK codebook. The resource indicator of the third PUCCH is a value of a PUCCH resource indicator on the third PDCCH, and the third PDCCH is the last PDCCH that is detected by the terminal device and that is used to schedule a PDSCH in a PDSCH set.

In another possible implementation, the terminal device determines the third time-frequency resource in a second PUCCH resource group specially configured for overlapping PUCCH resources. The following describes this implementation in detail by using an example in which the first uplink channel is a PUCCH.

The terminal device determines, in the second PUCCH resource group, a second PUCCH resource set corresponding to the quantity of bits of the third HARQ-ACK, where the second PUCCH resource group comprises configured for a PUCCH that carries the third HARQ-ACK, the second PUCCH resource group includes one or more PUCCH resource sets, and the second PUCCH resource group comprises time-frequency resources in the $j^{th}$ group of time-frequency resources in the N groups of time-frequency resources. It may also be understood that the second PUCCH resource group corresponds to a PUCCH sent on the $j^{th}$ group of time-frequency resources. After determining the second PUCCH resource set, the terminal device may determine the third time-frequency resource in the second PUCCH resource set, where j is a positive integer less than or equal to N, and j, i, and k are different values. For example, the terminal device may determine, in the second PUCCH resource set based on a resource indicator value of a third PUCCH, the third time-frequency resource that carries a third HARQ-ACK codebook. The resource indicator of the third PUCCH is a value of a PUCCH resource indicator on the third PDCCH, and the third PDCCH is the last PDCCH that is detected by the terminal device and that is used to schedule a PDSCH in a PDSCH set. The following provides, by using an implementation, description that when the first time-frequency resource overlaps the second time-frequency resource, the terminal device determines the third time-frequency resource in the second PUCCH resource group specially configured for the overlapping PUCCH resources.

Figure 6:
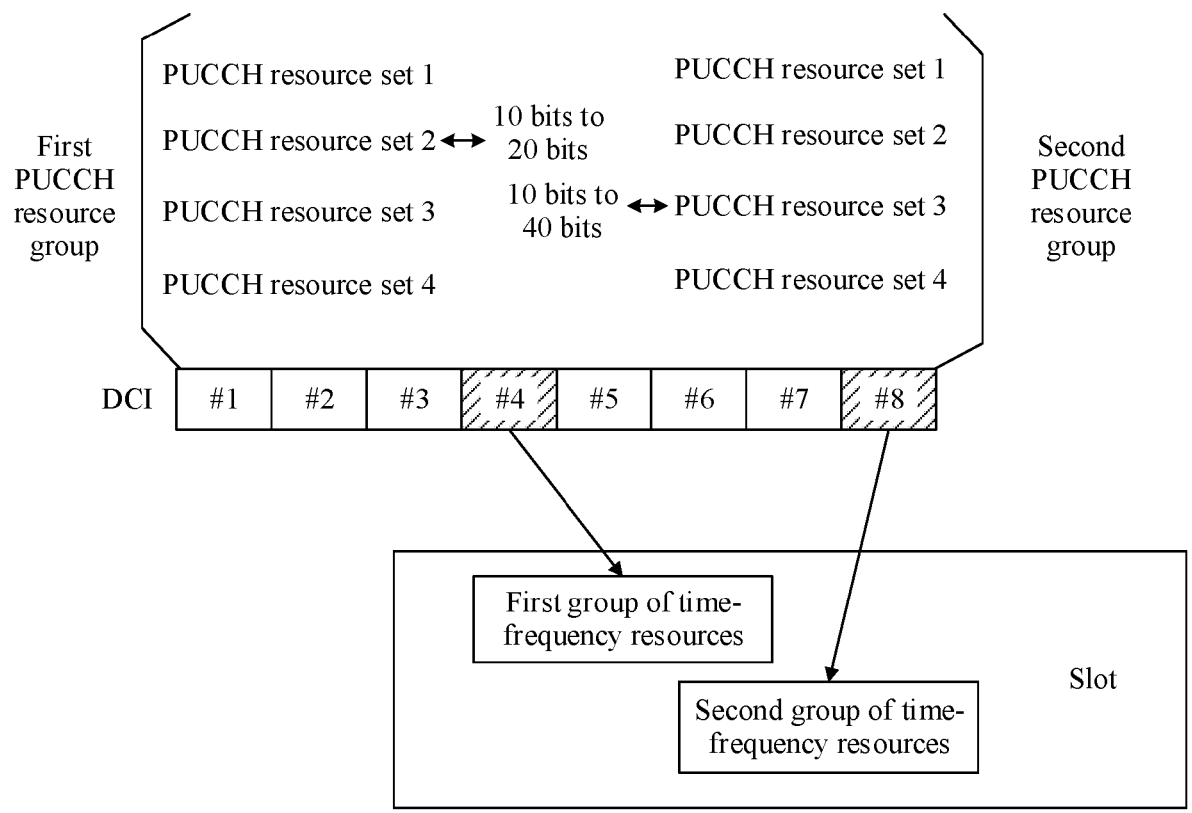
FIG. 6 is a schematic diagram of still another time unit grouping according to an embodiment of this application.

For example, FIG. 6 is a schematic diagram of time unit grouping according to an embodiment of this application. In FIG. 6, a time unit is a slot, and an example in which time-frequency resources in one time unit are grouped into a first group of time-frequency resources and a second group of time-frequency resources is used for illustration. The first uplink channel is sent on the first group of time-frequency resources, and the second uplink channel is sent on the second group of time-frequency resources. The first uplink channel carries four HARQ-ACKs indicated by DCI #1 to DCI #4, and the four HARQ-ACKs are carried on the first uplink channel. A PUCCH resource set 2 is selected from the first PUCCH resource group based on the quantity of bits (for example, 10 bits) of the four HARQ-ACKs, because the PUCCH resource set 2 corresponds to a bit quantity range: 10 bits to 20 bits. Similarly, four HARQ-ACKs indicated by DCI #5 to DCI #8 are carried on the second uplink channel, and a PUCCH resource set 3 is selected from the second PUCCH resource group based on a quantity 20 of bits of the four HARQ-ACKs.

When resources that carry a HARQ-ACK and that correspond to the PUCCH resource set 2 in the first PUCCH resource group overlap resources that carry a HARQ-ACK and that correspond to the PUCCH resource set 3 in the second PUCCH resource group, HARQ-ACK codebooks originally carried on the two PUCCHs may be jointly encoded as 30 bits by using the method in this application. If a PUCCH resource set is to be reselected from the second PUCCH resource group corresponding to the second uplink channel, the PUCCH resource set 3 is still selected. In this case, if the DCI #1 to the DCI #4 are lost during downlink transmission, only a 20-bit HARQ-ACK codebook indicated by the DCI #5 to the DCI #8 is transmitted on the second uplink channel. In this case, the network device is unaware of a loss of the DCI #1 to the DCI #4 during transmission. Therefore, when receiving the second uplink channel, the network device does not know whether the second uplink channel should be decoded by using 20 bits or 30 bits. For this case, in this embodiment of this application, a PUCCH resource group is specially configured for overlapping PUCCH resources. To be specific, in this application, PUCCH resource groups are separately configured for overlapping PUCCH resources and non-overlapping PUCCH resources. In this way, reliability of transmitting an uplink channel can be improved.

In still another possible implementation, when the first time-frequency resource partially or fully overlaps the second time-frequency resource, the terminal device sends only an uplink channel that meets a preset condition, and discards the other uplink channel. It may be understood that when more than two time-frequency resources overlap, the terminal device may send one uplink channel that meets the preset condition, and discard other uplink channels.

The foregoing preset condition is explained and described by using an example in which the terminal device sends the first uplink channel. If the terminal device sends the first uplink channel, the first uplink channel meets one or more of the following preset conditions:

Condition 1: A first time length corresponding to the first uplink channel is shorter than a first time length corresponding to the second uplink channel.

Condition 2: The first uplink channel is an uplink channel corresponding to DCI scrambled with a first RNTI.

Condition 3: The first uplink channel is an uplink channel carried on a time-frequency resource determined based on the K1 value or the SLIV index.

It should be noted that, in this embodiment of this application, the first DCI and the second DCI may be received by the terminal device from a same network device, or may be received by the terminal device from different network devices.

When the first DCI and the second DCI are received from different network devices, the two different network devices may both be transport points (TRP).

Figure 7:
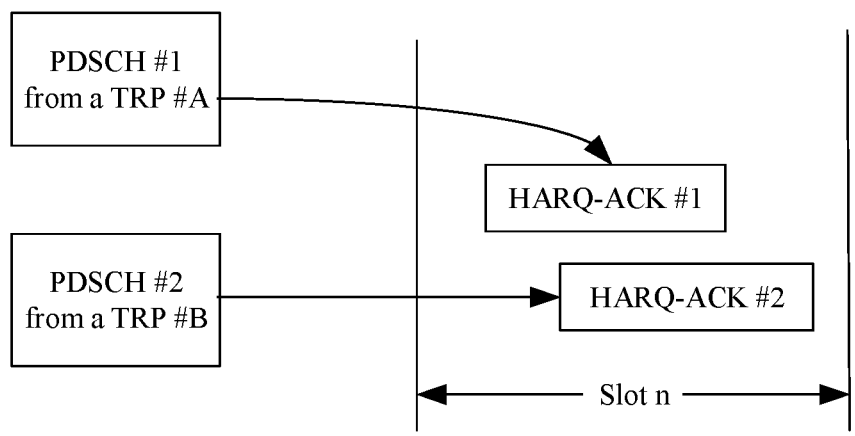
FIG. 7 is a schematic diagram of DCI scheduling according to an embodiment of this application.

When the first DCI and the second DCI are received from different network devices, if there is a non-ideal backhaul line between the different network devices, because network devices on the non-ideal backhaul line cannot learn of scheduling statuses of each other in real time, in this scenario, a network device sending the first DCI and a network device sending the second DCI cannot decode a HARQ-ACK codebook obtained by jointly coding the first HARQ-ACK and the second HARQ-ACK. For example, referring to FIG. 7, an example in which a network device is a TRP is used. It is assumed that the first DCI and the second DCI are received from different TRPs, the two different TRPs are a TRP #A and a TRP #B, the first DCI is sent by the TRP #A to the terminal device, the second DCI is sent by the TRP #B to the terminal device, and both feedback information HARQ-ACK #1 corresponding to a PDSCH #1 scheduled by the first DCI and feedback information HARQ-ACK #2 corresponding to a PDSCH #2 scheduled by the second DCI are indicated to be sent in a slot n. If there is a non-ideal backhaul line between the TRP #A and the TRP #B, that is, if the TRP #A and the TRP #B cannot learn of scheduling statuses of each other in real time, neither the TRP #A nor the TRP #B can decode a HARQ-ACK codebook obtained by jointly encoding the HARQ-ACK #1 and the HARQ-ACK #2.

Based on the foregoing problem, this embodiment of this application further provides a HARQ-ACK sending method. In this method, when the first time-frequency resource partially or fully overlaps the second time-frequency resource, the terminal device determines the first uplink channel that carries the first HARQ-ACK on a fourth time-frequency resource, and the second uplink channel that carries the second HARQ-ACK on a fifth time-frequency resource, where the fourth time-frequency resource is a time-frequency resource in the $m^{th}$ group of time-frequency resources included in the N groups of time-frequency resources, the fifth time-frequency resource is a time-frequency resource in the $n^{th}$ group of time-frequency resources included in the N groups of time-frequency resources, m and n are positive integers less than or equal to N, and m and n are different values.

Optionally, no time-frequency resource in the $m^{th}$ group of time-frequency resources overlaps a time-frequency resource in the $n^{th}$ group of time-frequency resources in time domain. An example in which the uplink channel is a PUCCH is used. The foregoing implementation may alternatively be understood as: When time-frequency resources corresponding to two PUCCHs overlap, a step of selecting time-frequency resources corresponding to the two PUCCHs is rolled back. In other words, non-overlapping time-frequency resources (which may alternatively be described as PUCCH resources) are reselected for the two PUCCHs that carry the HARQ-ACKs, so that the HARQ-ACKs carried on the two PUCCHs may be separately sent on the non-overlapping time-frequency resources.

In the foregoing method, an example in which only two HARQ-ACKs are sent is used for description. When more than two HARQ-ACKs are sent, the foregoing method is still applicable. For example, when more than two HARQ-ACKs are sent, when time-frequency resources corresponding to PUCCHs that carry the HARQ-ACKs overlap, the foregoing method may still be used to determine to separately send the HARQ-ACKs on more than two non-overlapping PUCCH resources.

It should be noted that the foregoing method is not limited to a scenario in which there is a non-ideal backhaul line between network devices. In another scenario, the foregoing method is still applicable. It should be further noted that, in the foregoing non-ideal backhaul line scenario, one HARQ-ACK may alternatively be discarded, and only the other HARQ-ACK is transmitted. For details, refer to the foregoing description of the method for discarding a HARQ-ACK. Details are not described herein again.

Before the terminal device determines the first uplink channel that carries the first HARQ-ACK on the fourth time-frequency resource, and the second uplink channel that carries the second HARQ-ACK on the fifth time-frequency resource, the terminal device further needs to determine the fourth time-frequency resource and the fifth time-frequency resource. The following specifically describes how the terminal device determines the fourth time-frequency resource and the fifth time-frequency resource by using an example in which the first uplink channel and the second uplink channel are PUCCHs.

In a possible implementation, the terminal device determines, in a third PUCCH resource group, a third PUCCH resource set corresponding to the quantity of bits of the first HARQ-ACK, and determines the fourth time-frequency resource in the third PUCCH resource set. The terminal device determines, in a fourth PUCCH resource group, a fourth PUCCH resource set corresponding to the quantity of bits of the second HARQ-ACK, and determines the fifth time-frequency resource in the fourth PUCCH resource set.

The third PUCCH resource group includes one or more PUCCH resource sets, the third PUCCH resource group is time-frequency resources in the $m^{th}$ group of time-frequency resources. The fourth PUCCH resource group includes one or more PUCCH resource sets, and the fourth PUCCH resource group comprises time-frequency resources in the $n^{th}$ group of time-frequency resources. The third PUCCH resource group and the fourth PUCCH resource group are used to select a PUCCH resource when the first time-frequency resource partially or fully overlaps the second time-frequency resource.

The third PUCCH resource group and the fourth PUCCH resource group may be preconfigured, or may be configured by the network device, for example, may be configured by the network device (for example, a base station) by using a higher layer parameter or radio resource control (RRC) signaling.

It should be further noted that the third PUCCH resource group and the fourth PUCCH resource group may meet the following condition: No PUCCH resource in the third PUCCH resource group overlaps a PUCCH resource in the fourth PUCCH resource group in time domain. This may alternatively be understood as: No PUCCH resource in the third PUCCH resource group has an OFDM symbol in common with any PUCCH resource in the fourth PUCCH resource group. In this way, when time-frequency resources corresponding to two PUCCHs overlap, non-overlapping PUCCH resources may be selected from two preconfigured PUCCH resource groups (for example, the third PUCCH resource group and the fourth PUCCH resource group) that have no overlapping PUCCH resource for HARQ-ACKs carried on the two PUCCHs.

For example, the preconfigured PUCCH resource groups are the third PUCCH resource group and the fourth PUCCH resource group. The terminal device may select one PUCCH resource from each of the third PUCCH resource group and the fourth PUCCH resource group based on quantities of bits of the HARQ-ACKs and a PUCCH resource indicator (or referred to as an ACK-NACK resource indicator, ARI) in the last DCI, to transmit two HARQ-ACK codebooks that are carried on two originally overlapping PUCCHs.

Figure 8:
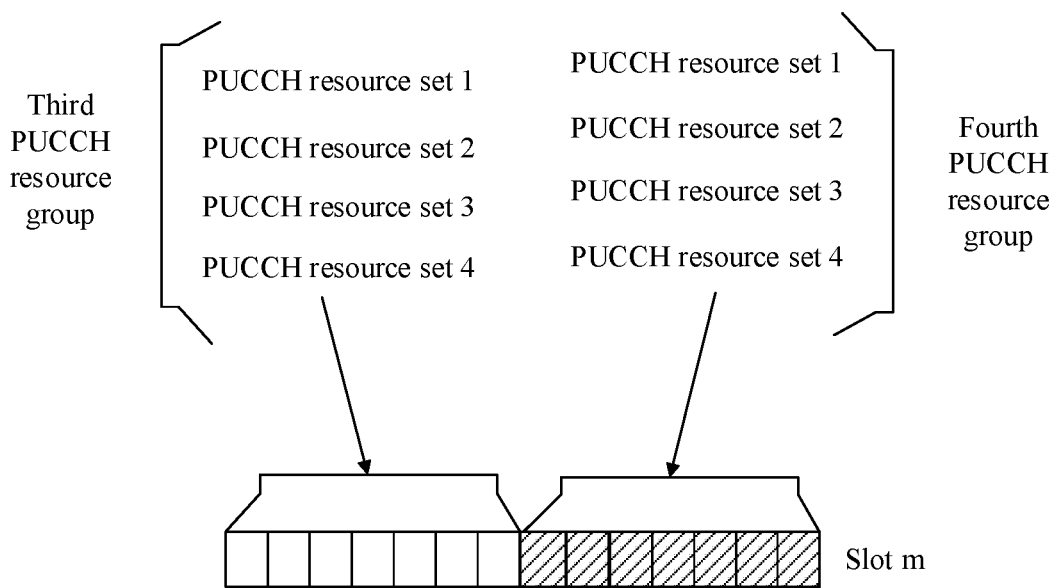
FIG. 8 is a schematic diagram of a PUCCH resource group according to an embodiment of this application.

FIG. 8 is a possible schematic diagram of the third PUCCH resource group and the fourth PUCCH resource group. In FIG. 8, an example in which the third PUCCH resource group includes a PUCCH resource set 1 to a PUCCH resource set 4 and the fourth PUCCH resource group includes a PUCCH resource set 1 to a PUCCH resource set 4 is used for illustration. It can be learned from FIG. 8 that the third PUCCH resource group occupies the first seven symbols in a slot m, the fourth PUCCH resource group occupies the last seven symbols in the slot m, and no PUCCH resource in the third PUCCH resource group overlaps a PUCCH resource in the fourth PUCCH resource group in time domain. It may be understood that FIG. 8 is merely a possible schematic diagram, and does not constitute a limitation.

This embodiment of this application further provides another HARQ-ACK sending method. In the method, when the first time-frequency resource partially or fully overlaps the second time-frequency resource, the terminal device still uses the first time-frequency resource to carry the first uplink channel of the first HARQ-ACK, and the terminal device determines a second uplink channel that carries the second HARQ-ACK on a sixth time-frequency resource, where the sixth time-frequency resource is a time-frequency resource in the $s^{th}$ group of time-frequency resources included in the N groups of time-frequency resources, s is a positive integer less than or equal to N, and s and i are different values. Optionally, the sixth time-frequency resource in the $s^{th}$ group of time-frequency resources does not overlap the first time-frequency resource in the $i^{th}$ group of time-frequency resources in time domain. According to this implementation, when the first time-frequency resource partially or fully overlaps the second time-frequency resource, the terminal device may keep the first time-frequency resource that carries the first HARQ-ACK unchanged, and select the time-frequency resource that carries the second HARQ-ACK. For example, the uplink channels are PUCCHs. When time-frequency resources corresponding to the two PUCCHs overlap, the HARQ-ACKs may be sent on two non-overlapping PUCCH resources by using this method.

Before the terminal device determines the first uplink channel that carries the first HARQ-ACK still on the first time-frequency resource, and determines the second uplink channel that carries the second HARQ-ACK on the sixth time-frequency resource, the terminal device further needs to determine the first time-frequency resource and the sixth time-frequency resource. The following specifically describes how the terminal device determines the first time-frequency resource and the sixth time-frequency resource by using an example in which the first uplink channel and the second uplink channel are PUCCHs.

In a possible implementation, the terminal device determines, in a first PUCCH resource group, a fifth PUCCH resource set corresponding to the quantity of bits of the first HARQ-ACK, and determines the first time-frequency resource in the fifth PUCCH resource set. The terminal device determines, in a fifth PUCCH resource group, a sixth PUCCH resource set corresponding to the quantity of bits of the second HARQ-ACK, and determines the sixth time-frequency resource in the sixth PUCCH resource set.

The first PUCCH resource group corresponds to a PUCCH transmitted on the $i^{th}$ group of time-frequency resources, the first PUCCH resource group includes one or more PUCCH resource sets, and the fifth PUCCH resource group includes one or more PUCCH resource sets. The fifth PUCCH resource group is used to reselect a PUCCH resource when the first time-frequency resource partially or fully overlaps the second time-frequency resource.

The foregoing fifth PUCCH resource group may be preconfigured. It may be understood that the sixth time-frequency resource may be selected from a preconfigured PUCCH resource group. The preconfigured PUCCH resource group may be configured by the network device, for example, may be configured by the network device (for example, a base station) by using a higher layer parameter or radio resource control (RRC) signaling.

Figure 9:
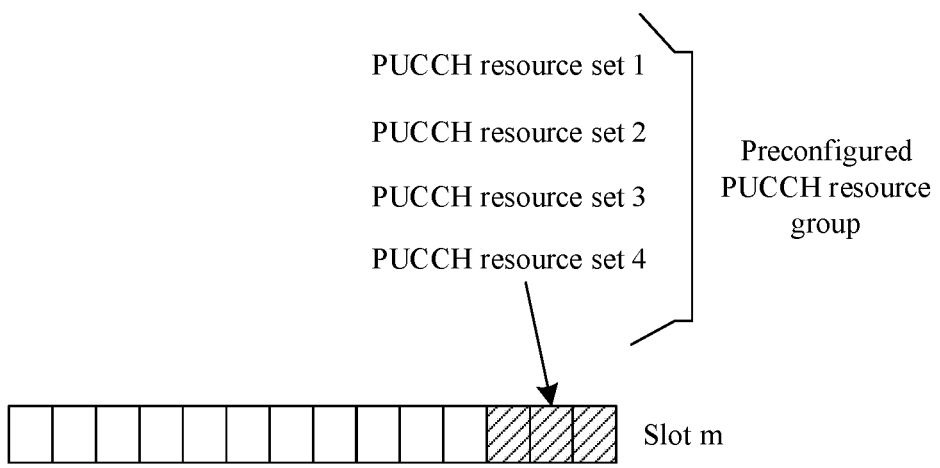
FIG. 9 is another schematic diagram of a PUCCH resource group according to an embodiment of this application.

Optionally, all PUCCH resources in the preconfigured PUCCH resource group may be located on several symbols at an edge of a slot, occupy a relatively few time domain resources, and are unlikely to overlap another resource. For example, referring to FIG. 9, it is assumed that the preconfigured PUCCH resource group includes four PUCCH resource sets: a PUCCH resource set 1, a PUCCH resource set 2, a PUCCH resource set 3, and a PUCCH resource set 4. Each PUCCH resource set includes a PUCCH resource. In FIG. 9, these PUCCH resources are located at an edge of a slot m, occupy relatively few time domain resources, and are unlikely to overlap another resource.

In a possible implementation, for the foregoing implementation, the first uplink channel meets one or more of the following conditions:

Condition 1: A first time length corresponding to the first uplink channel is shorter than a first time length corresponding to the second uplink channel.

Condition 2: The first uplink channel is an uplink channel corresponding to DCI scrambled by a first RNTI, and the first RNTI may be an MCS-RNTI.

Condition 3: The first uplink channel is an uplink channel carried on a time-frequency resource determined based on the K1 value or the SLIV index.

According to the method provided in the foregoing implementation, when feedback information HARQ-ACKs corresponding to PDSCHs from at least two network devices (for example, TRPs on a non-ideal backhaul line) are transmitted in one slot, and a plurality of PUCCH resources that carry the HARQ-ACKs overlap, non-overlapping PUCCH resources can be determined for all the HARQ-ACKs by using the foregoing method, and a HARQ-ACK corresponding to a PDSCH sent by each network device is sent to the network device. In this way, a transmission latency can be reduced, and transmission efficiency is improved. This can further avoid a problem that the network device cannot decode a jointly encoded HARQ-ACK codebook received by the network devices, and can ensure that all HARQ-ACKs that need to be transmitted in one slot can be transmitted in a timely manner.

In this embodiment of this application, when the first time-frequency resource overlaps the second time-frequency resource, the terminal device may reallocate time domain resources for transmitting PUCCHs, so that an error can be avoided when the first uplink channel and the second uplink channel are respectively transmitted on the first time-frequency resource and the second time-frequency resource that overlap, thereby improving reliability of transmitting an uplink channel.

This embodiment of this application further provides a communications method. The method includes: The terminal device receives first DCI and second DCI; determines, in a preconfigured first PUCCH resource group, a first time-frequency resource used to send a first uplink channel; determines, in a preconfigured second PUCCH resource group, a second time-frequency resource used to send a second uplink channel; sends the first uplink channel on the first time-frequency resource; and sends the second uplink channel on the second time-frequency resource, where the first PUCCH resource group and the second PUCCH resource group are PUCCH resource groups configured for a same slot, the first uplink channel is used to carry a first HARQ-ACK scheduled by the first DCI, and the second uplink channel is used to carry a second HARQ-ACK scheduled by the second DCI.

The first DCI corresponds to the first PUCCH resource group, and the second DCI corresponds to the second PUCCH resource group. This may be understood as: A PUCCH resource group may be preconfigured based on a DCI-related condition.

In a possible design, the PUCCH resource group may be configured based on one or more of the following DCI-related conditions:

1. A PDCCH monitoring occasion indicates a location, in a time unit (for example, a slot), of a start symbol of an occasion on which the terminal device detects a PDCCH. For example, the terminal device may obtain a potential time domain location of the PDCCH monitoring occasion in the slot based on higher-layer configuration information such as a PDCCH monitoring pattern parameter. When the start symbol of the PDCCH monitoring occasion belongs to the first half of the slot, DCI carried by the PDCCH may correspond to the first PUCCH resource group. When the start symbol of the PDCCH monitoring occasion belongs to the second half slot of the slot, the DCI carried by the PDCCH corresponds to the second PUCCH resource group.

2. Search space identity (SS ID): The terminal device monitors a PDCCH candidate set (or referred to as a search space), and attempts to decode each PDCCH in the set by monitoring a DCI format. For example, assuming that aggregation levels corresponding to a first SS ID are {1, 2, 4, 8}, and aggregation levels corresponding to a second SS ID is {1, 2, 8}, it may be preconfigured that the first SS ID corresponds to the first PUCCH resource group, and the second SS ID corresponds to the second PUCCH resource group. In this configuration case, after the terminal device receives the first DCI, if the terminal device determines that the first DCI corresponds to the first SS ID, the terminal device may correspondingly determine, in the first PUCCH resource group, the first time-frequency resource used to send the first uplink channel that carries the first HARQ-ACK scheduled by the first DCI. Similarly, after the terminal device receives the second DCI, if the terminal device determines that the second DCI corresponds to the second SS ID, the terminal device may correspondingly determine, in the second PUCCH resource group, the second time-frequency resource used to send the second uplink channel that carries the second HARQ-ACK scheduled by the second DCI.

3. An RNTI is used to scramble an information bit of DCI. The terminal device separately performs descrambling on several possible RNTI values. If an information bit obtained after descrambling is performed based on an RNTI value may pass a CRC check, it indicates that the DCI is scrambled by the RNTI. An RNTI of DCI carried by a PDCCH configured by a higher layer may include an existing RNTI such as a C-RNTI, a CS-RNTI, a P-RNTI, or an SI-RNTI, or may include a new RNTI. For example, the new RNTI may be referred to as an X-RNTI. A name of the new RNTI is not limited in this application, and may be referred to as another RNTI. There may be one or more types of X-RNTIs. A typical feature is that a value of the new RNTI is not equal to a value of the existing RNTI (for example, the C-RNTI, the CS-RNTI, the P-RNTI, or the SI-RNTI). A typical function may include: The new RNTI is used to indicate that data of a PDSCH scheduled by a PDCCH is from a first-type service, for example, the URLLC service. The X-RNTI may be an MCS-C-RNTI or another RNTI that identifies a ultra-reliable low-latency service. In this case, a PUCCH resource group may be divided based on a type of an RNTI of a PDCCH. For example, DCI carried on a PDCCH corresponding to the existing RNTI (for example, the C-RNTI, the CS-RNTI, the P-RNTI, or the SI-RNTI) corresponds to the first PUCCH resource group, and DCI carried on a PDCCH corresponding to the new RNTI (for example, the X-RNTI) corresponds to the second PUCCH resource group. In this configuration case, after the terminal device receives the first DCI, if the terminal device determines that a PDCCH that carries the first DCI corresponds to the existing RNTI, the terminal device may correspondingly determine, in the first PUCCH resource group, the first time-frequency resource used to send the first uplink channel that carries the first HARQ-ACK scheduled by the first DCI. Similarly, after the terminal device receives the second DCI, if the terminal device determines that a PDCCH that carries the second DCI corresponds to the new RNTI, the terminal device may correspondingly determine, in the second PUCCH resource group, the second time-frequency resource used to send the second uplink channel that carries the second HARQ-ACK scheduled by the second DCI.

4. DCI format: The DCI format may be used to distinguish between DCI carried on PDCCHs. The terminal device may attempt to decode each DCI format with a different quantity of bits (payload size) through PDCCH blind detection, perform cyclic redundancy check (CRC), determine, through the CRC, the quantity of bits of the DCI corresponding to the PDCCH, and further determine a DCI format of the PDCCH with reference to a format indicator byte in the decoded DCI. A DCI format configured by a higher layer may include a format 1_0, a format 1_1, and a format 1_x. The format 1_0 and the format 1_1 may be existing DCI formats. The format 1_x may be a new DCI format different from the format 1_0 and the format 1_1. There may be one or more types of format 1_x. The format 1_x may be a DCI format that identifies a ultra-reliable low-latency service. A typical feature of the new DCI format may include: The format 1_x has the quantity of bits different from those of the format 1_0 and the format 1_1. In this application, a PUCCH resource group may be divided based on a type of a DCI format. For example, DCI whose DCI format is an existing DCI format (for example, the format 1_0 or the format 11) may correspond to the first PUCCH resource group, and DCI whose DCI format is the new DCI format (for example, the format 1_x) may correspond to the second PUCCH resource group. In this configuration case, after the terminal device receives the first DCI, if the terminal device determines that a DCI format corresponding to the first DCI is the existing DCI format, the terminal device may correspondingly determine, in the first PUCCH resource group, the first time-frequency resource used to send the first uplink channel that carries the first HARQ-ACK scheduled by the first DCI. Similarly, after the terminal device receives the second DCI, if the terminal device determines that a DCI format corresponding to the second DCI is the new DCI format, the terminal device may correspondingly determine, in the second PUCCH resource group, the second time-frequency resource used to send the second uplink channel that carries the second HARQ-ACK scheduled by the second DCI.

5. Network device that sends DCI If the first DCI and the second DCI are sent by a first network device and a second network device respectively, it may be configured, by using a higher layer parameter, that the first DCI corresponds to the first PUCCH resource group and the second DCI corresponds to the second PUCCH resource group.

It should be noted that the first DCI and the second DCI may be from a same network device, or may be from different network devices. In other words, the first network device and the second network device may be a same network device, or may be different network devices.

In a possible design, when the first time-frequency resource partially or fully overlaps the second time-frequency resource, the terminal device reselects, for the first uplink channel and/or the second uplink channel, a time-frequency resource used to carry sending of the first uplink channel and/or the second uplink channel.

In a possible implementation, when the first time-frequency resource partially or fully overlaps the second time-frequency resource, the terminal device reselects, for the first uplink channel and the second uplink channel, time-frequency resources used to carry sending of the first uplink channel and the second uplink channel. In this implementation, the terminal device may determine, in a preconfigured third PUCCH resource group, a third time-frequency resource used to send the first uplink channel, determine, in a preconfigured fourth PUCCH resource group, a fourth time-frequency resource used to send the second uplink channel, send the first uplink channel on the third time-frequency resource, and send the second uplink channel on the fourth time-frequency resource. In a possible design, no PUCCH resource in the third PUCCH resource group has an OFDM symbol in common with any PUCCH resource in the fourth PUCCH resource group. In other words, a PUCCH resource in the third PUCCH resource group does not overlap a PUCCH resource in the fourth PUCCH resource group. In this design, the first uplink channel and the second uplink channel have no common OFDM symbol, so that the first HARQ-ACK and the second HARQ-ACK can be carried on different uplink channels in one slot for separate sending.

In a possible implementation, when the first time-frequency resource partially or fully overlaps the second time-frequency resource, the terminal device reselects, for the second uplink channel, a time-frequency resource used to carry sending of the second uplink channel. In this implementation, the terminal device may determine, in a preconfigured fifth PUCCH resource group, a fifth time-frequency resource used to send the second uplink channel, and send the second uplink channel on the fifth time-frequency resource. In a possible design, no PUCCH resource in the first PUCCH resource group has an OFDM symbol in common with any PUCCH resource in the fifth PUCCH resource group. In other words, a PUCCH resource in the first PUCCH resource group does not overlap a PUCCH resource in the fifth PUCCH resource group. In this design, the first uplink channel and the second uplink channel have no common OFDM symbol, so that the first HARQ-ACK and the second HARQ-ACK can be carried on different uplink channels in one slot for separate sending.

It should be noted that, in this application, reselecting a time-frequency resource means discarding a previously selected time-frequency resource and reselecting a time-frequency resource. For example, that the terminal device reselects, for the second uplink channel, a time-frequency resource used to carry sending of the second uplink channel may be understood as: The terminal device discards the time-frequency resource that is determined for the second uplink channel before the reselection, and reselects a time-frequency resource for the second uplink channel.

The foregoing mainly describes the solutions provided in the embodiments of this application from a perspective of interaction between the terminal device and the network device. It may be understood that to implement the foregoing functions, the terminal device and the network device include corresponding hardware structures and/or software modules for performing the functions. A person skilled in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application In the embodiments of this application, function modules of the terminal device and the network device may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Based on a same inventive concept, an embodiment of this application further provides an apparatus configured to implement any method in the embodiments of this application. For example, the apparatus includes units (or means) configured to implement steps performed by the terminal device in any method in the embodiments of this application. For another example, another apparatus is further provided, including units (or means) configured to implement the steps performed by the network device in any method in the embodiments of this application.

Figure 10:
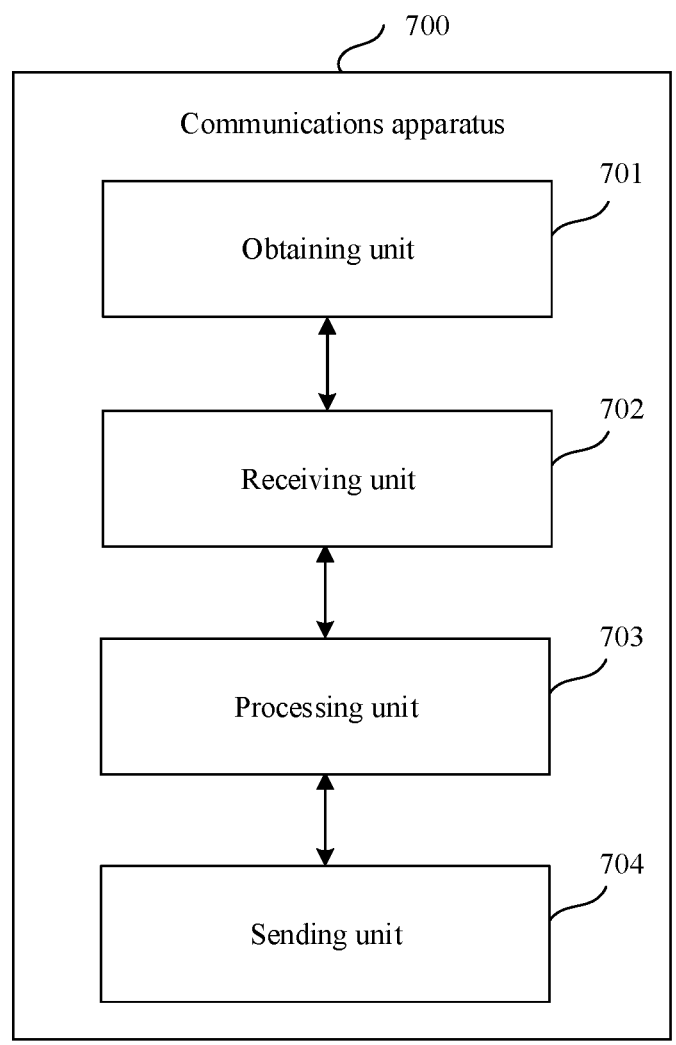
FIG. 10 is a schematic structural diagram of a communications apparatus according to an embodiment of this application.

In a possible implementation, an embodiment of this application provides a communications apparatus 700. The communications apparatus 700 may be used in a terminal device. FIG. 10 is a schematic structural diagram of the communications apparatus 700 according to an embodiment of this application. Referring to FIG. 10, the communications apparatus 700 may include an obtaining unit 701, a receiving unit 702, and a processing unit 703.

Based on the communications method shown in FIG. 4, in the communications apparatus 700 shown in FIG. 10, the obtaining unit 701 may be used by the communications apparatus 700 to perform the step shown in S101, the receiving unit 702 may be used by the communications apparatus 700 to perform the step shown in S102, and the processing unit 703 may be used by the communications apparatus 700 to perform the step shown in S103 or S104.

Figure 11:
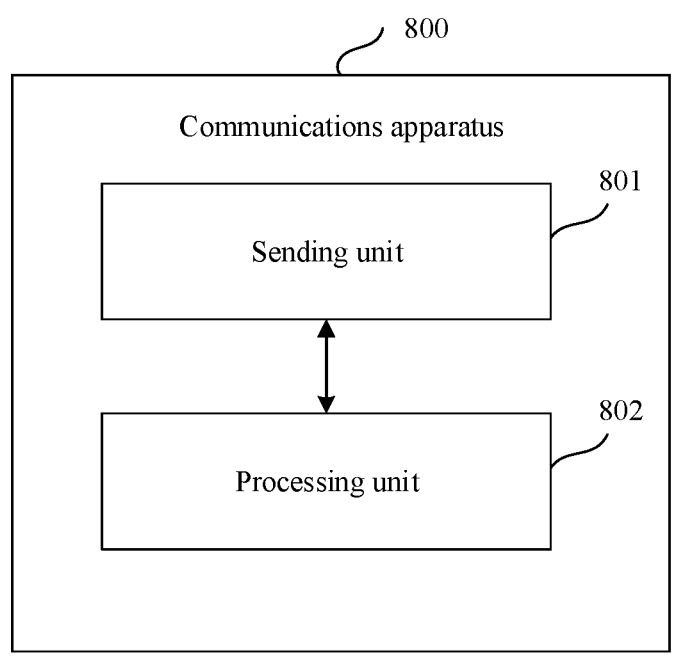
FIG. 11 is a schematic structural diagram of another communications apparatus according to an embodiment of this application.

In another possible implementation, an embodiment of this application provides a communications apparatus 800. The communications apparatus 800 may be used in a network device. FIG. 11 is a schematic structural diagram of the communications apparatus 800 according to an embodiment of this application. Referring to FIG. 11, the communications apparatus 800 may include a sending unit 801. In an implementation, the communications apparatus 800 may further include a processing unit 802.

Based on the communications method shown in FIG. 4, in the communications apparatus 800 shown in FIG. 11, the sending unit 801 may be used by the communications apparatus 800 to perform the step shown in S102.

When the communications apparatus 700 is used in a terminal device, and the communications apparatus 800 is used in a network device, the following operations may be further performed:

In a possible design, the first parameter includes one or more of a K1 value, a first time length, a codebook identifier, a radio network temporary identifier RNTI, an uplink channel end symbol, a physical downlink control channel PDCCH monitoring occasion, or a start and length indicator value SLIV index, the K1 value is a time units offset from a time unit in which a PDSCH is located to a time unit in which an uplink channel of a HARQ-ACK corresponding to the PDSCH is located, and the first time length represents a time length corresponding to the K1 value.

In a possible design, the receiving unit 702 is further configured to:

receive second DCI.

The processing unit 703 is further configured to:

determine, in the N groups of time-frequency resources based on the grouping relationship, the $k^{th}$ group of time-frequency resources corresponding to a first parameter related to the second DCI received by the receiving unit 702, where k is a positive integer less than or equal to N, and k and i are different values; and determine a second uplink channel that carries a second HARQ-ACK on a second time-frequency resource in the $k^{th}$ group of time-frequency resources.

In a possible design, the processing unit 703 is further configured to:

when the first time-frequency resource partially or fully overlaps the second time-frequency resource, combine the first HARQ-ACK and the second HARQ-ACK into a third HARQ-ACK, and determine a third uplink channel that carries the third HARQ-ACK on a third time-frequency resource, where the third time-frequency resource is a time-frequency resource in a group of time-frequency resources included in the N groups of time-frequency resources.

In a possible design, the third time-frequency resource is a time-frequency resource in the $i^{th}$ group of time-frequency resources when the first uplink channel meets one or more of the following conditions:

a first time length corresponding to the first uplink channel is shorter than a first time length corresponding to the second uplink channel;

the first uplink channel is an uplink channel corresponding to DCI scrambled with a first RNTI; and the first uplink channel is an uplink channel carried on a time-frequency resource determined based on the K1 value or the SLIV index.

In a possible design, the first uplink channel is a PUCCH; and the processing unit 703 is further configured to:

determine, in a first PUCCH resource group, a first PUCCH resource set corresponding to the quantity of bits of the third HARQ-ACK, where the first PUCCH resource group corresponds to a PUCCH transmitted on the $i^{th}$ group of time-frequency resources, and the first PUCCH resource group includes one or more PUCCH resource sets; and determine the third time-frequency resource in the first PUCCH resource set.

In a possible design, the first uplink channel is a PUCCH; and the processing unit 703 is further configured to:

determine, in a second PUCCH resource group, a second PUCCH resource set corresponding to the quantity of bits of the third HARQ-ACK, where the second PUCCH resource group comprises configured for a PUCCH that carries the third HARQ-ACK, the second PUCCH resource group includes one or more PUCCH resource sets, and the second PUCCH resource group comprises time-frequency resources in the $j^{th}$ group of time-frequency resources in the N groups of time-frequency resources; and determine the third time-frequency resource in the second PUCCH resource set, where j is a positive integer less than or equal to N, and j, i, and k are different values.

In a possible design, the processing unit 703 is further configured to:

when the first time-frequency resource partially or fully overlaps the second time-frequency resource, determine the first uplink channel that carries the first HARQ-ACK on a fourth time-frequency resource, and the second uplink channel that carries the second HARQ-ACK on a fifth time-frequency resource, where the fourth time-frequency resource is a time-frequency resource in the $m^{th}$ group of time-frequency resources included in the N groups of time-frequency resources, the fifth time-frequency resource is a time-frequency resource in the $n^{th}$ group of time-frequency resources included in the N groups of time-frequency resources, m and n are positive integers less than or equal to N, and m and n are different values.

In a possible design, the $m^{th}$ group of time-frequency resources does not overlap the $n^{th}$ group of time-frequency resources in time domain.

In a possible design, the first uplink channel and the second uplink channel are PUCCHs, and the processing unit 703 is further configured to:

determine, in a third PUCCH resource group, a third PUCCH resource set corresponding to the quantity of bits of the first HARQ-ACK, where the third PUCCH resource group includes one or more PUCCH resource sets, and the third PUCCH resource group is time-frequency resources in the $m^{th}$ group of time-frequency resources; determine the fourth time-frequency resource in the third PUCCH resource set; determine, in a fourth PUCCH resource group, a fourth PUCCH resource set corresponding to the quantity of bits of the second HARQ-ACK, where the fourth PUCCH resource group includes one or more PUCCH resource sets, and the fourth PUCCH resource group comprises time-frequency resources in the nth group of time-frequency resources; and determine the fifth time-frequency resource in the fourth PUCCH resource set, where both the third PUCCH resource group and the fourth PUCCH resource group are preconfigured.

In a possible design, the processing unit 703 is further configured to:

when the first time-frequency resource partially or fully overlaps the second time-frequency resource, determine the second uplink channel that carries the second HARQ-ACK on a sixth time-frequency resource, where the sixth time-frequency resource is a time-frequency resource in the $s^{th}$ group of time-frequency resources included in the N groups of time-frequency resources, s is a positive integer less than or equal to N, and s and i are different values.

In a possible design, the sixth time-frequency resource in the $s^{th}$ group of time-frequency resources does not overlap the first time-frequency resource in the $i^{th}$ group of time-frequency resources in time domain.

In a possible design, the first uplink channel and the second uplink channel are PUCCHs, and the processing unit 703 is further configured to:

determine, in a first PUCCH resource group, a fifth PUCCH resource set corresponding to the quantity of bits of the first HARQ-ACK, where the first PUCCH resource group corresponds to a PUCCH transmitted on the $i^{th}$ group of time-frequency resources, and the first PUCCH resource group includes one or more PUCCH resource sets; determine the first time-frequency resource in the fifth PUCCH resource set; determine, in a fifth PUCCH resource group, a sixth PUCCH resource set corresponding to the quantity of bits of the second HARQ-ACK, where the fifth PUCCH resource group includes one or more PUCCH resource sets, and the fifth PUCCH resource group is preconfigured; and determine the sixth time-frequency resource in the sixth PUCCH resource set.

In a possible design, the first uplink channel meets one or more of the following conditions:

a first time length corresponding to the first uplink channel is shorter than a first time length corresponding to the second uplink channel;

the first uplink channel is an uplink channel corresponding to DCI scrambled with a first RNTI; and the first uplink channel is an uplink channel carried on a time-frequency resource determined based on the K1 value or the SLIV index.

In a possible design, the processing unit 802 is configured to determine the grouping relationship based on one or more of the following conditions:

the K1 value;
the first time length;
the SLIV index;
the codebook identifier;
the RNTI;
the uplink channel end symbol; and
the PDCCH monitoring occasion.

In another possible communications method, the communications apparatus 700 may further include a sending unit 704.

The receiving unit 702 is configured to receive first DCI and second DCI.

The processing unit 703 is configured to determine, in a preconfigured first PUCCH resource group, a first time-frequency resource used to send a first uplink channel, and determine, in a preconfigured second PUCCH resource group, a second time-frequency resource used to send a second uplink channel.

The sending unit 704 is configured to send the first uplink channel on the first time-frequency resource, and send the second uplink channel on the second time-frequency resource.

The first PUCCH resource group and the second PUCCH resource group are PUCCH resource groups configured for a same slot, the first uplink channel is used to carry a first hybrid automatic repeat request-acknowledgment HARQ-ACK scheduled by the first DCI, and the second uplink channel is used to carry a second HARQ-ACK scheduled by the second DCI.

It should be noted that the first DCI and the second DCI may be from a same network device, or may be from different network devices.

In a possible design, the processing unit 703 is further configured to:

when the first time-frequency resource partially or fully overlaps the second time-frequency resource, reselect, for the first uplink channel and/or the second uplink channel, a time-frequency resource used to carry sending of the first uplink channel and/or the second uplink channel.

In a possible implementation, the processing unit 703 is further configured to:

when the first time-frequency resource partially or fully overlaps the second time-frequency resource, reselect, for the first uplink channel and the second uplink channel, time-frequency resources used to carry sending of the first uplink channel and the second uplink channel. In this implementation, the processing unit 703 may determine, in a preconfigured third PUCCH resource group, a third time-frequency resource used to send the first uplink channel, determine, in a preconfigured fourth PUCCH resource group, a fourth time-frequency resource used to send the second uplink channel, send the first uplink channel on the third time-frequency resource by using the sending unit 704, and send the second uplink channel on the fourth time-frequency resource by using the sending unit 704.

In a possible design, no PUCCH resource in the third PUCCH resource group has an OFDM symbol in common with any PUCCH resource in the fourth PUCCH resource group. In other words, a PUCCH resource in the third PUCCH resource group does not overlap a PUCCH resource in the fourth PUCCH resource group.

In a possible implementation, the processing unit 703 is further configured to:

when the first time-frequency resource partially or fully overlaps the second time-frequency resource, reselect, for the second uplink channel, a time-frequency resource used to carry sending of the second uplink channel. In this implementation, the processing unit 703 may determine, in a preconfigured fifth PUCCH resource group, a fifth time-frequency resource used to send the second uplink channel, and send the second uplink channel on the fifth time-frequency resource by using the sending unit 704. In a possible design, no PUCCH resource in the first PUCCH resource group has an OFDM symbol in common with any PUCCH resource in the fifth PUCCH resource group. In other words, a PUCCH resource in the first PUCCH resource group does not overlap a PUCCH resource in the fifth PUCCH resource group.

It should be understood that division into the units in the foregoing apparatuses is merely logical function division. In actual implementation, all or some of the units may be integrated into a physical entity, or may be physically separate. In addition, all the units in the apparatuses may be implemented in a form of software invoked by a processing element, or may be implemented in a form of hardware, or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented in a form of software invoked by the processing element.

In an example, a unit in any one of the foregoing apparatuses may be one or more integrated circuits configured to implement the foregoing methods, for example, one or more application specific integrated circuits (ASIC), one or more microprocessors (DSP), one or more field programmable gate arrays (FPGA), or a combination of at least two of these forms of integrated circuits. For another example, when a unit in the apparatus may be implemented by a program scheduled by a processing element, the processing element may be a general-purpose processor, for example, a central processing unit ( ) or another processor that can invoke the program. For another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 12:
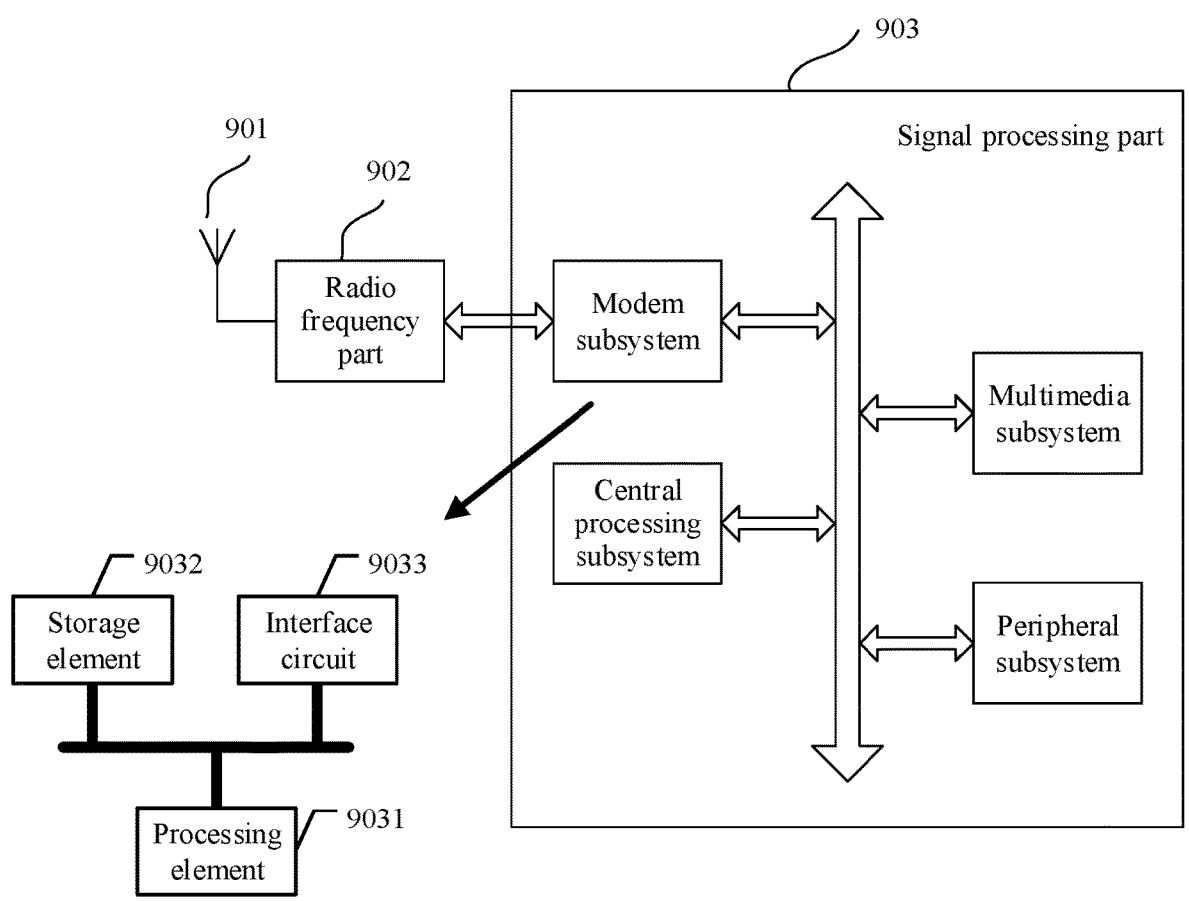
FIG. 12 is a schematic structural diagram of a terminal device according to an embodiment of this application.

FIG. 12 is a schematic structural diagram of a terminal device according to an embodiment of this application. The terminal device is configured to implement operations of the terminal device in the foregoing embodiments. As shown in FIG. 12, the terminal device includes an antenna 901, a radio frequency part 902, and a signal processing part 903. The antenna 901 is connected to the radio frequency part 902. In a downlink direction, the radio frequency part 902 receives, by using the antenna 901, information sent by a network device, and sends, to the signal processing part 903 for processing, the information sent by the network device. In an uplink direction, the signal processing part 903 processes information of the terminal device, and sends the information to the radio frequency part 902. The radio frequency part 902 processes the information of the terminal device, and then sends processed information to the network device through the antenna 901.

The signal processing part 903 may include a modem subsystem, configured to process data at each communications protocol layer. The signal processing part 903 may further include a central processing subsystem, configured to process an operating system and an application layer that are of the terminal device. In addition, the signal processing part 903 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a separately disposed chip. Optionally, the foregoing apparatus used in the terminal device may be located in the modem subsystem.

The modem subsystem may include one or more processing elements 9031, for example, include one main control CPU and another integrated circuit. In addition, the modem subsystem may further include a storage element 9032 and an interface circuit 9033. The storage element 9032 is configured to store data and a program. However, a program used to perform the methods performed by the terminal device in the foregoing methods may not be stored in the storage element 9032, but is stored in a memory outside the modem subsystem, and is loaded and used by the modem subsystem when to be used. The interface circuit 9033 is configured to communicate with another subsystem. The foregoing apparatus used in the terminal device may be located in the modem subsystem, and the modem subsystem may be implemented by a chip. The chip includes at least one processing element and an interface circuit. The processing element is configured to perform the steps of any one of the methods performed by the terminal device. The interface circuit is configured to communicate with another apparatus. In an implementation, units of the terminal device that implement the steps of the methods in the embodiments of this application may be implemented by a program invoked by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the methods performed by the terminal device in the methods according to the embodiments of this application may be in a storage element located on a different chip from the processing element, namely, an off-chip storage element. In this case, the processing element invokes or loads the program from the off-chip storage element to the on-chip storage element, to invoke and perform the methods performed by the terminal device in the foregoing method embodiments.

In still another implementation, units that implement the steps in the foregoing methods in the embodiments of this application and that are in the apparatus used in the terminal device may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal device that implement the steps in the methods in the embodiments of this application may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by the processing element invoking a program, and functions of some units may be implemented by the integrated circuit.

It can be learned that the foregoing apparatus used in the terminal device may include at least one processing element and an interface circuit. The at least one processing element is configured to perform any one of the methods performed by the terminal device provided in the foregoing method embodiments. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processor element in combination with an instruction; or may certainly perform, by combining the first manner and the second manner, some or all steps performed by the terminal device.

As described above, the processing element herein may be a general purpose processor, for example, a CPU, or may be one or more integrated circuits configured to implement the foregoing methods, for example, one or more ASICs, one or more microprocessors DSPs, one or more FPGAs, or a combination of at least two of these forms of the integrated circuits.

A storage element may be one memory, or may be a general term of a plurality of storage elements.

Figure 13:
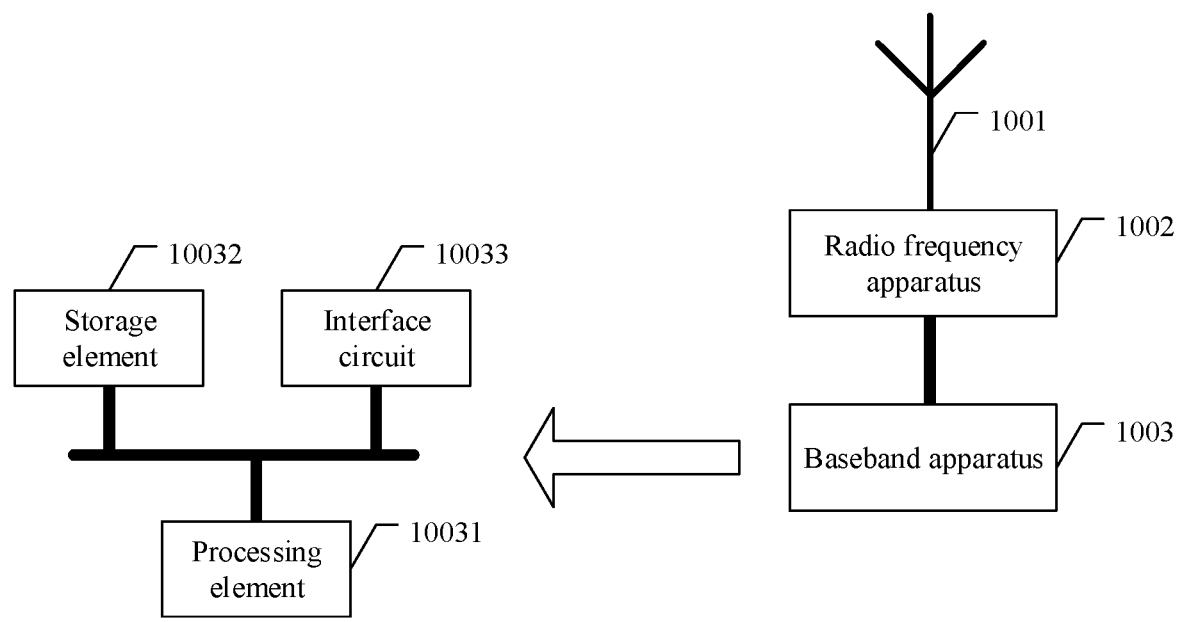
FIG. 13 is a schematic structural diagram of a network device according to an embodiment of this application.

FIG. 13 is a schematic structural diagram of a network device according to an embodiment of this application. The network device is configured to implement operations of the network device in the foregoing embodiments. As shown in FIG. 13, the network device includes an antenna 1001, a radio frequency apparatus 1002, and a baseband apparatus 1003. The antenna 1001 is connected to the radio frequency apparatus 1002. In an uplink direction, the radio frequency apparatus 1002 receives, through the antenna 1001, information sent by a terminal device, and sends, to the baseband apparatus 1003 for processing, the information sent by the terminal device. In a downlink direction, the baseband apparatus 1003 processes information of a terminal device, and sends the information to the radio frequency apparatus 1002. The radio frequency apparatus 1002 processes the information of the terminal device, and then sends the processed information to the terminal device through the antenna 1001.

The baseband apparatus 1003 may include one or more processing elements 10031, for example, include a main control CPU and another integrated circuit. In addition, the baseband apparatus 1003 may further include a storage element 10032 and an interface circuit 10033. The storage element 10032 is configured to store a program and data. The interface circuit 10033 is configured to exchange information with the radio frequency apparatus 1002, and the interface circuit is, for example, a common public radio interface (CPRI). The foregoing apparatus used in the network device may be located in the baseband apparatus 1003. For example, the foregoing apparatus used in the network device may be a chip in the baseband apparatus 1003. The chip includes at least one processing element and an interface circuit. The processing element is configured to perform the steps of any method performed by the network device. The interface circuit is configured to communicate with another apparatus. In an implementation, units of the network device that implement the steps of the methods in the embodiments of this application may be implemented by a program invoked by a processing element. For example, the apparatus used in the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units that implement the steps in the foregoing methods in the embodiments of this application and that are in the apparatus used in the network device may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the methods in the embodiments of this application may be integrated together, and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by a program invoked by the processing element, and functions of some units may be implemented by the integrated circuit.

It can be learned that the foregoing apparatus used in the network device may include at least one processing element and an interface circuit. The at least one processing element is configured to perform any method performed by the network device provided in the foregoing method embodiments. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with an instruction; or may certainly perform, by combining the first manner and the second manner, some or all steps performed by the network device.

As described above, the processing element herein may be a general purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

The embodiments of this application further provide a communications method. The method may be performed by a terminal device or a communications apparatus (for example, a chip system) that can support the terminal device in implementing the method. In this application, an example in which the terminal device performs the method is used for description.

Figure 14:
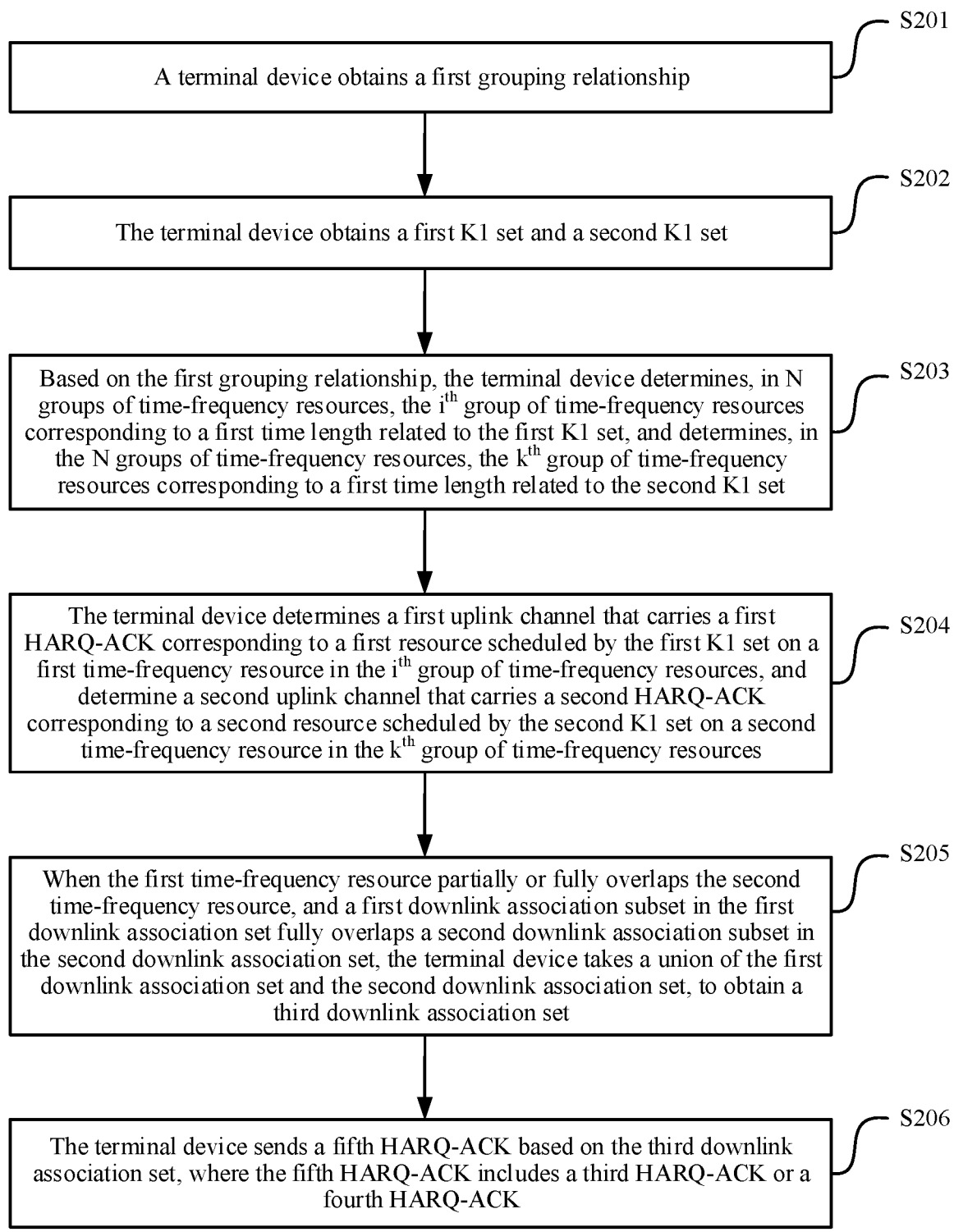
FIG. 14 shows another communications method according to an embodiment of this application.

FIG. 14 shows another communications method according to an embodiment of this application. The method includes the following steps.

S201. A terminal device obtains a first grouping relationship.

The first grouping relationship represents a correspondence between a first time length and N groups of time-frequency resources, the N groups of time-frequency resources are obtained by grouping time-frequency resources in one time unit, each group of time-frequency resources corresponds to one or more first time lengths, the first time length is related to a K1 set, the K set includes a plurality of K values, the K value is the quantity of time units offset from a time unit in which a PDSCH is located to a time unit in which an uplink channel of a HARQ-ACK corresponding to the PDSCH is located, a time-frequency resource in each group of time-frequency resources is a time-frequency resource of an uplink channel that carries a HARQ-ACK, the first time length is a unit time length of the K1 value or the first time length represents a time length corresponding to the K1 value, and N is a positive integer greater than or equal to 2.

In this embodiment of this application, the terminal device may receive the first grouping relationship from a network device, or the terminal device locally obtains the first grouping relationship. If the terminal device locally obtains the first grouping relationship, the first grouping relationship may be preset by the terminal device, or may be obtained from the network device and stored in advance. In this embodiment of this application, if the first grouping relationship is received by the terminal device from the network device, before the network device sends the first grouping relationship to the terminal device, the network device may further determine the first grouping relationship based on the first time length. For a method for determining the first grouping relationship by the network device based on the first time length, refer to the foregoing description. Details are not described herein again.

In this application, the first time length may be a slot, or may be a mini-slot, for example, may be a ½ slot, or may be a ¼ slot, or may be M time domain symbols, where M is a positive integer less than 14.

In this embodiment, the described HARQ-ACK may be a semi-static codebook. An example in which the HARQ-ACK is a semi-static codebook is used for description below. For a semi-static HARQ-ACK, the network device or a higher layer may configure several possible K1 values for the terminal device. In this application, the several possible K1 values are referred to as a K set. Certainly, this application is not limited thereto. A set including a plurality of K1 values may be referred to as a K1 set.

In addition, in this application, that the first time length is related to the K1 set may mean that there is a correspondence between the first time length and the K1 set. The correspondence may be configured via higher layer signaling or by the network device. It may be understood that, after obtaining the K1 set, the terminal device may correspondingly determine the first time length corresponding to the K1 set.

S202. The terminal device obtains a first K1 set and a second K1 set.

Optionally, the first K1 set and the second K1 set may be locally obtained by the terminal device, or may be obtained from the network device, or may be configured via higher layer signaling.

In this application, the first grouping relationship may be in a form of a list, or may be in another form. This is not limited.

Table 5 shows a possible first grouping relationship. In Table 5, N=2 is used as an example. In other words, one time unit is divided into two groups of time-frequency resources: a first group of time-frequency resources and a second group of time-frequency resources, and an example in which the first time length includes a slot and a ½ slot is used for illustration.

TABLE 5

| First time length | N groups of time-frequency resources |
|---|---|
| ½ slot | First group of time-frequency resources |
| Slot | Second group of time-frequency resources |

In this embodiment, after determining the correspondence between the first time length (the slot and the ½ slot) and the N groups of time-frequency resources (the first group of time-frequency resources and the second group of time-frequency resources) based on the first grouping relationship, the terminal device may further determine a correspondence between the K1 set and the N groups of time-frequency resources based on the correspondence between the first time length and the K1 set. Table 6 shows a correspondence between the K1 set, the first time length, and the N groups of time-frequency resources based on an assumed condition in Table 5. The first K1 set is {0, 1, 2, 3}, the second K1 set is {1, 2, 3, 4}, the first K1 set is related to the slot, and the second K1 set is related to the ½ slot.

TABLE 6

| K1 set | First time length | N groups of time-frequency resources |
|---|---|---|
| First K1 set {0, 1, 2, 3} | ½ slot | First group of time-frequency resources |
| Second K1 set {1, 2, 3, 4} | Slot | Second group of time-frequency resources |

S203. Based on the first grouping relationship, the terminal device determines, in the N groups of time-frequency resources, the $i^{th}$ group of time-frequency resources corresponding to a first time length related to the first K1 set, and determines, in the N groups of time-frequency resources, the $k^{th}$ group of time-frequency resources corresponding to a first time length related to the second K1 set. For example, Table 6 is used as an example. Based on the first grouping relationship, the terminal device may determine, in the two groups of time-frequency resources, the first group of time-frequency resources corresponding to the first time length related to the first K1 set, and determine, in the N groups of time-frequency resources, the second group of time-frequency resources corresponding to the first time length related to the second K1 set.

Herein, i is a positive integer less than or equal to N, k is a positive integer less than or equal to N, and k and i are different values.

S204. The terminal device determines a first uplink channel that carries a first HARQ-ACK on a first time-frequency resource in the $i^{th}$ group of time-frequency resources, and determines a second uplink channel that carries a second HARQ-ACK on a second time-frequency resource in the $k^{th}$ group of time-frequency resources. In this way, the terminal device may use different groups of time-frequency resources to carry the first uplink channel and the second uplink channel. Compared with the prior art in which only one uplink channel can be sent in one time unit, in the method in this application, a plurality of uplink channels can be sent in one time unit.

The first HARQ-ACK corresponds to a first downlink association set, and the second HARQ-ACK corresponds to a second downlink association set.

In this embodiment of this application, a downlink association set may be determined based on the K1 set.

In this embodiment of this application, the first time-frequency resource may be some time-frequency resources in the $i^{th}$ group of time-frequency resources, or may be all time-frequency resources in the $i^{th}$ group of time-frequency resources. The second time-frequency resource may be some time-frequency resources in the $k^{th}$ group of time-frequency resources, or may be all time-frequency resources in the $k^{th}$ group of time-frequency resources. The uplink channel may include a physical uplink control channel (PUCCH) or a physical uplink shared channel (PUSCH).

S205. When the first time-frequency resource partially or fully overlaps the second time-frequency resource, and a first downlink association subset in the first downlink association set fully overlaps a second downlink association subset in the second downlink association set, the terminal device takes a union of the first downlink association set and the second downlink association set, to obtain a third downlink association set.

The first downlink association subset in the first downlink association set corresponds to a third HARQ-ACK, the second downlink association subset in the second downlink association set corresponds to a fourth HARQ-ACK, the third HARQ-ACK belongs to the first HARQ-ACK, and the fourth HARQ-ACK belongs to the second HARQ-ACK.

In this embodiment of this application, the union of the first downlink association set and the second downlink association set may be a set obtained by combining resources included in the first downlink association set and resources included in the second downlink association set, that is, the third downlink association set. The third downlink association set includes resources included in the first downlink association set and the second downlink association set, but there is no repeated resource in the third downlink association set. The union of the first downlink association set and the second downlink association set may be denoted as the first downlink association set U the second downlink association set.

S206. The terminal device sends a fifth HARQ-ACK based on the third downlink association set, where the fifth HARQ-ACK includes the third HARQ-ACK or the fourth HARQ-ACK.

In this embodiment, the fifth HARQ-ACK may further include a sixth HARQ-ACK, and the first HARQ-ACK may include the sixth HARQ-ACK and the third HARQ-ACK. The fifth HARQ-ACK may further include a seventh HARQ-ACK, and the second HARQ-ACK may include the seventh HARQ-ACK and the fourth HARQ-ACK.

The terminal device may send the fifth HARQ-ACK, or send the fifth HARQ-ACK and the sixth HARQ-ACK to the network device.

In this method, the terminal device sends only one of the third HARQ-ACK and the fourth HARQ-ACK based on the third downlink association set, thereby reducing the quantity of bits of a fed back HARQ-ACK, and improving HARQ-ACK transmission efficiency.

The following further describes the foregoing method in an implementation.

Figure 15:
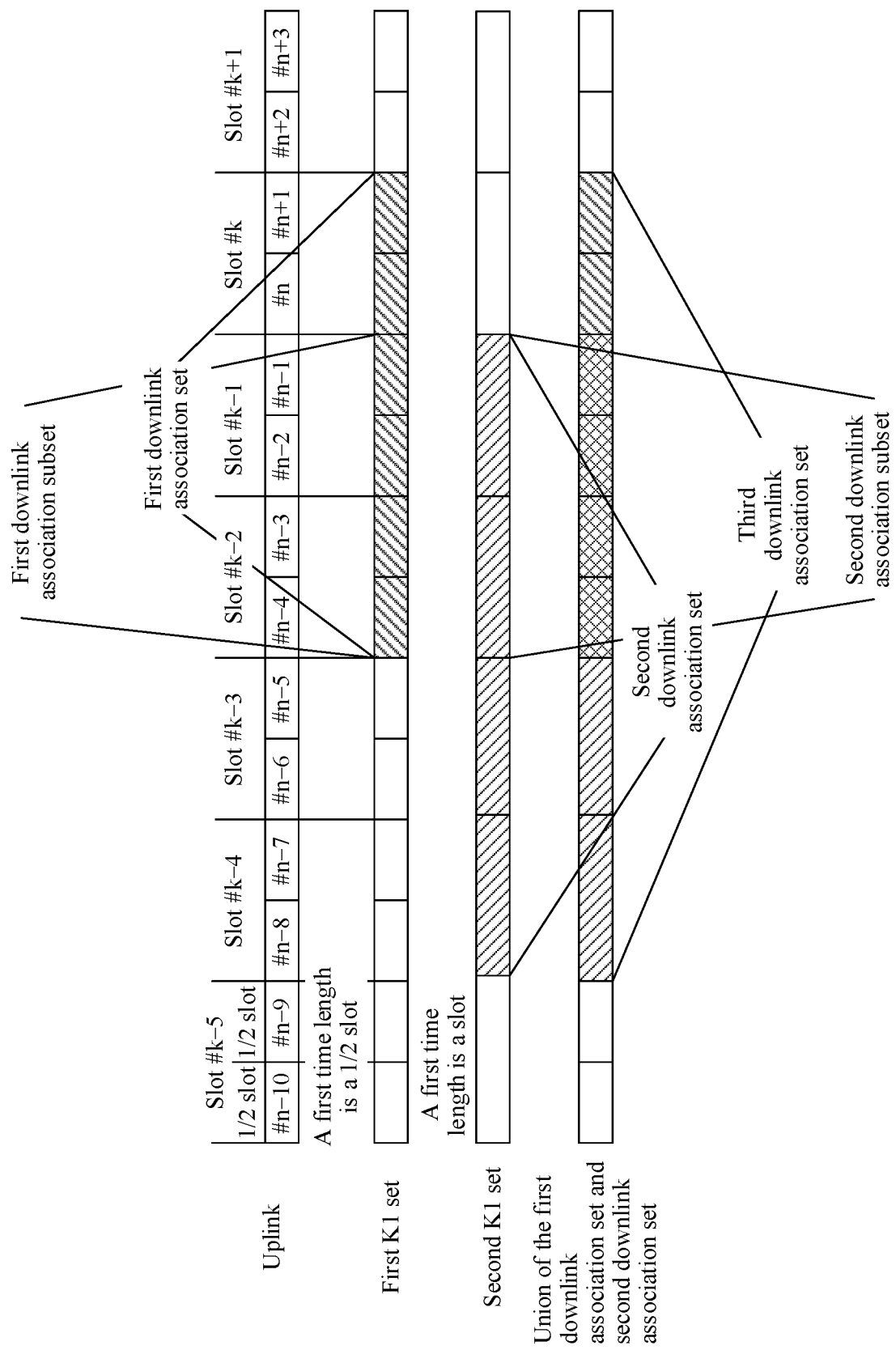
FIG. 15 is a schematic diagram of taking a union of resources according to an embodiment of this application.

FIG. 15 is a schematic diagram of taking a union of resources according to an embodiment of this application. In FIG. 15, it is assumed that the first grouping relationship obtained by the terminal device is the grouping relationship shown in Table 5, the first K1 set obtained by the terminal device is {0, 1, 2, 3}, and the second K1 set obtained by the terminal device is {1, 2, 3, 4}. Further, based on the first grouping relationship, the terminal device may determine, in two groups of time-frequency resources, a first group of time-frequency resources corresponding to the first time length related to the first K1 set, and determine, in the two groups of time-frequency resources, a second group of time-frequency resources corresponding to the first time length related to the second K1 set. In FIG. 15, it is assumed that a first time unit is a slot #k. In other words, the two groups of time-frequency resources are time-frequency resources in the slot #k. Further, the terminal device may determine the first uplink channel that carries the first HARQ-ACK on the first time-frequency resource in the first group of time-frequency resources, and may further determine the second uplink channel that carries the second HARQ-ACK on the second time-frequency resource in the second group of time-frequency resources. It can be learned from FIG. 15 that a first downlink association set scheduled by or corresponding to the first K1 set may include a ½ slot #n−4, a ½ slot #n−3, a ½ slot #n−2, a ½ slot #n−1, a ½ slot #n, and a ½ slot #n+1, the second downlink association set scheduled by or corresponding to the second K1 set may include a slot #k−4, a slot #k−3, a slot #k−2, and a slot #k−1. Assuming that the first time-frequency resource partially or fully overlaps the second time-frequency resource, and the first downlink association subset in the first downlink association set fully overlaps the second downlink association subset in the second downlink association set, as shown in FIG. 15, the first downlink association subset includes the ½ slot #n−4, the ½ slot #n−3, the ½ slot #n−2, and the ½ slot #n−1, and the second downlink association subset includes the slot #k−2 and the slot #k−1. According to the method in this application, for the first downlink association subset and the second downlink association subset that overlap each other, only HARQ-ACKs corresponding to some resources (for example, the first downlink association subset or the second downlink association subset) are sent. Specifically, the terminal device may take a union of the first downlink association set and the second downlink association set to obtain the third downlink association set, and then may send the fifth HARQ-ACK based on the third downlink association set. The fifth HARQ-ACK includes the third HARQ-ACK or the fourth HARQ-ACK. As shown in FIG. 15, the first downlink association subset corresponds to the third HARQ-ACK, and the second downlink association subset corresponds to the fourth HARQ-ACK. According to the method of this application, the fifth HARQ-ACK sent by the terminal device based on the third downlink association set includes only one of the third HARQ-ACK and the fourth HARQ-ACK, so that the quantity of bits for joint feedback can be reduced. In the implementation shown in FIG. 15, if the first HARQ-ACK and the second HARQ-ACK are directly cascade combined, it may be understood that a HARQ-ACK obtained through the cascade combination include the sixth HARQ-ACK, the third HARQ-ACK, the seventh HARQ-ACK, and the fourth HARQ-ACK. Assuming that a 1-bit HARQ-ACK is fed back on a resource with one granularity, the HARQ-ACK obtained through the cascade combination includes 10 bits. In other words, the terminal device needs to feed back a 10-bit HARQ-ACK. If a granularity of overlapping resources is a ½ slot, the fifth HARQ-ACK includes the third HARQ-ACK. If the terminal device feeds back the fifth HARQ-ACK based on the third downlink association set, the terminal device needs to feed back only an 8-bit HARQ-ACK. If the granularity of the overlapping resources is a slot, the fifth HARQ-ACK includes the fourth HARQ-ACK. If the terminal device feeds back the fifth HARQ-ACK based on the third downlink association set, the terminal device needs to feed back only a 6-bit HARQ-ACK based on the third downlink association set.

It may be understood that operations performed by the terminal device in the communications methods provided in the embodiments shown in FIG. 14 and FIG. 15 may be performed by a communications apparatus that is used in the terminal device and that is provided in the embodiments of this application, for example, the communications apparatus 700, or may be performed by the terminal device provided in the embodiments of this application, for example, the terminal device shown in FIG. 15. For example, the communications apparatus or the terminal device may include an obtaining unit, a processing unit, and a sending unit. The steps S201 and S202 may be performed by the obtaining unit, the steps S203 to S205 may be performed by the processing unit, and the step S206 may be performed by the sending unit. Alternatively, the communications apparatus or the terminal device includes a processor and a transceiver that are coupled to a memory, and the steps S201 to S206 may be performed by the processor that is coupled to the memory. Alternatively, the steps S201 to S205 may be performed by the processor coupled to the memory, and the step S206 is performed by the transceiver. Alternatively, the steps S202 to S205 may be performed by the processor coupled to the memory, and the steps S201 and S206 are performed by the transceiver. Details are not described.

Operations performed by the network device in the communications methods provided in the embodiments shown in FIG. 14 and FIG. 15 may be performed by a communications apparatus that is used in the network device and that is provided in the embodiments of this application, for example, the communications apparatus 800, or may be performed by the network device provided in the embodiments of this application, for example, the network device shown in FIG. 13. Details are not described.

According to the methods provided in the embodiments of this application, this application further provides a communications system. The communications system includes the foregoing terminal device and network device.

The embodiments of this application further provide a computer storage medium. The computer storage medium stores a computer-executable instruction, and when the computer-executable instruction is invoked by a computer, the computer is enabled to perform any one of the foregoing methods.

The embodiments of this application further provide a computer program product. The computer program product stores an instruction, and when the instruction is run on a computer, the computer is enabled to perform any one of the foregoing methods.

The embodiments of this application further provide a chip system. The chip system includes a processor, and may further include a memory, to implement any one of the foregoing methods. The chip system may include a chip, or may include a chip and another discrete component.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a special-purpose computer, an embedded processor, or another programmable data processing device to generate a machine, so that an instruction that is executed by a processor of a computer or another programmable data processing device generates an apparatus configured to implement a specified function in one or more processes in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some possible embodiments of this application are described, a person skilled in the art can make changes and modifications to the embodiments once the basic inventive concept is learned. Therefore, the following claims are intended to be construed to cover the embodiments of this application and all changes and modifications falling within the scope of this application.

It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A communications method, comprising:
obtaining a grouping relationship, wherein the grouping relationship represents a correspondence between a first parameter and N groups of time-frequency resources, the N groups of time-frequency resources are obtained by grouping time-frequency resources in one time unit, each group of time-frequency resources corresponds to one or more first parameters, the first parameter is related to downlink control information (DCI), a time-frequency resource in each group of time-frequency resources is available for an uplink channel that carries a hybrid automatic repeat request-acknowledgement (HARQ-ACK), and N is a positive integer greater than or equal to 2;
receiving first DCI;
determining, in the N groups of time-frequency resources based on the grouping relationship, the $i^{th}$ group of time-frequency resources corresponding to a first parameter related to the first DCI, wherein i is a positive integer less than or equal to N; and
determining a first uplink channel that carries a first HARQ-ACK on a first time-frequency resource in the $i^{th}$ group of time-frequency resources.

2. The method according to claim 1, wherein the first parameter comprises one or more of a K1 value, a first time length, a codebook identifier, a radio network temporary identifier (RNTI), an uplink channel end symbol, a physical downlink control channel (PDCCH) monitoring occasion, or a start and length indicator value (SLIV) index, the K1 value is a time unit offset between a time unit in which a physical downlink shared channel (PDSCH) is located and a time unit in which an uplink channel of a HARQ-ACK corresponding to the PDSCH is located, and the first time length represents a time length corresponding to the K1 value.

3. The method according to claim 2, further comprising:
receiving second DCI;
determining, in the N groups of time-frequency resources based on the grouping relationship, the $k^{th}$ group of time-frequency resources corresponding to a first parameter related to the second DCI, wherein k is a positive integer less than or equal to N, and k and i are different values; and
determining a second uplink channel that carries a second HARQ-ACK on a second time-frequency resource in the $k^{th}$ group of time-frequency resources.

4. The method according to claim 3, further comprising:
when the first time-frequency resource partially or fully overlaps the second time-frequency resource, combining the first HARQ-ACK and the second HARQ-ACK into a third HARQ-ACK, and determining a third uplink channel that carries the third HARQ-ACK on a third time-frequency resource, wherein the third time-frequency resource is a time-frequency resource in a group of time-frequency resources comprised in the N groups of time-frequency resources.

5. The method according to claim 4, wherein the third time-frequency resource is a time-frequency resource in the $i^{th}$ group of time-frequency resources when the first uplink channel meets one or more of the following conditions:
a first time length corresponding to the first uplink channel is shorter than a first time length corresponding to the second uplink channel;
the first uplink channel is an uplink channel corresponding to DCI scrambled with a first RNTI; and
the first uplink channel is an uplink channel carried on a time-frequency resource determined based on the K1 value or the SLIV index.

6. The method according to claim 5, wherein the method further comprises:
determining, in a first uplink channel resource group, a first uplink channel resource set corresponding to a quantity of bits of the third HARQ-ACK, wherein the first uplink channel resource group corresponds to an uplink channel transmitted on the $i^{th}$ group of time-frequency resources, and the first uplink channel resource group comprises one or more uplink channel resource sets; and
determining the third time-frequency resource in the first uplink channel resource set.

7. The method according to claim 5, wherein the first uplink channel is a physical uplink control channel (PUCCH), and the method further comprises:
determining, in a first PUCCH resource group, a first PUCCH resource set corresponding to the quantity of bits of the third HARQ-ACK, wherein the first PUCCH resource group corresponds to a PUCCH transmitted on the $i^{th}$ group of time-frequency resources, and the first PUCCH resource group comprises one or more PUCCH resource sets; and
determining the third time-frequency resource in the first PUCCH resource set.

8. The method according to claim 4, wherein the method further comprises:
determining, in a second uplink channel resource group, a second uplink channel resource set corresponding to a quantity of bits of the third HARQ-ACK, wherein the second uplink channel resource group is configured for the uplink channel that carries the third HARQ-ACK, the second uplink channel resource group comprises one or more uplink channel resource sets, and the second uplink channel resource group comprises time-frequency resources in the $j^{th}$ group of time-frequency resources in the N groups of time-frequency resources; and determining the third time-frequency resource in the second uplink channel resource set, wherein j is a positive integer less than or equal to N, and j, i, and k are different values.

9. The method according to claim 4, wherein the first uplink channel is a physical uplink control channel (PUCCH), and the method further comprises:
determining, in a second PUCCH resource group, a second PUCCH resource set corresponding to the quantity of bits of the third HARQ-ACK, wherein the second PUCCH resource group comprises configured for a PUCCH that carries the third HARQ-ACK, the second PUCCH resource group comprises one or more PUCCH resource sets, and the second PUCCH resource group comprises time-frequency resources in the $j^{th}$ group of time-frequency resources in the N groups of time-frequency resources; and
determining the third time-frequency resource in the second PUCCH resource set, wherein j is a positive integer less than or equal to N, and j, i, and k are different values.

10. The method according to claim 3, further comprising:
when the first time-frequency resource partially or fully overlaps the second time-frequency resource, determining the first uplink channel that carries the first HARQ-ACK on a fourth time-frequency resource, and the second uplink channel that carries the second HARQ-ACK on a fifth time-frequency resource, wherein the fourth time-frequency resource is a time-frequency resource in the $m^{th}$ group of time-frequency resources comprised in the N groups of time-frequency resources, the fifth time-frequency resource is a time-frequency resource in the $n^{th}$ group of time-frequency resources comprised in the N groups of time-frequency resources, m and n are positive integers less than or equal to N, and m and n are different values.

11. A communications apparatus comprising:
a processor;
a memory coupled to the processor, the memory being configured to store computer-executable instructions; and
wherein the processor is configured to execute the computer-executable instructions stored in the memory, to enable the communications apparatus to perform:
obtaining a grouping relationship, wherein the grouping relationship represents a correspondence between a first parameter and N groups of time-frequency resources, the N groups of time-frequency resources are obtained by grouping time-frequency resources in one time unit, each group of time-frequency resources corresponds to one or more first parameters, the first parameter is related to downlink control information (DCI), a time-frequency resource in each group of time-frequency resources is available for an uplink channel that carries a hybrid automatic repeat request-acknowledgement (HARQ-ACK), and N is a positive integer greater than or equal to 2;
receiving first DCI;
determining, in the N groups of time-frequency resources based on the grouping relationship, the $i^{th}$ group of time-frequency resources corresponding to a first parameter related to the first DCI, wherein i is a positive integer less than or equal to N; and
determining a first uplink channel that carries a first HARQ-ACK on a first time-frequency resource in the $i^{th}$ group of time-frequency resources.

12. The apparatus according to claim 11, wherein the first parameter comprises one or more of a K1 value, a first time length, a codebook identifier, a radio network temporary identifier (RNTI), an uplink channel end symbol, a physical downlink control channel (PDCCH) monitoring occasion, or a start and length indicator value (SLIV) index, the K1 value is a time unit offset between a time unit in which a physical downlink shared channel (PDSCH) is located and a time unit in which an uplink channel of a HARQ-ACK corresponding to the PDSCH is located, and the first time length represents a time length corresponding to the K1 value.

13. The apparatus according to claim 12, wherein the memory further comprises instructions that, when executed by the processor, cause the apparatus to:
receive second DCI;
determine, in the N groups of time-frequency resources based on the grouping relationship, the $k^{th}$ group of time-frequency resources corresponding to a first parameter related to the second DCI, wherein k is a positive integer less than or equal to N, and k and i are different values; and
determine a second uplink channel that carries a second HARQ-ACK on a second time-frequency resource in the $k^{th}$ group of time-frequency resources.

14. The apparatus according to claim 13, wherein the memory further comprises instructions that, when executed by the processor, cause the apparatus to:
when the first time-frequency resource partially or fully overlaps the second time-frequency resource, combine the first HARQ-ACK and the second HARQ-ACK into a third HARQ-ACK, and determine a third uplink channel that carries the third HARQ-ACK on a third time-frequency resource, wherein the third time-frequency resource is a time-frequency resource in a group of time-frequency resources comprised in the N groups of time-frequency resources.

15. The apparatus according to claim 14, wherein the third time-frequency resource is a time-frequency resource in the $i^{th}$ group of time-frequency resources when the first uplink channel meets one or more of the following conditions:
a first time length corresponding to the first uplink channel is shorter than a first time length corresponding to the second uplink channel;
the first uplink channel is an uplink channel corresponding to DCI scrambled with a first RNTI; and
the first uplink channel is an uplink channel carried on a time-frequency resource determined based on the K1 value or the SLIV index.

16. The apparatus according to claim 14, wherein the memory further comprises instructions that, when executed by the processor, cause the apparatus to:
determine, in a second uplink channel resource group, a second uplink channel resource set corresponding to a quantity of bits of the third HARQ-ACK, wherein the second uplink channel resource group is configured for the uplink channel that carries the third HARQ-ACK, the second uplink channel resource group comprises one or more uplink channel resource sets, and the second uplink channel resource group comprises time-frequency resources in the $j^{th}$ group of time-frequency resources in the N groups of time-frequency resources; and determine the third time-frequency resource in the second uplink channel resource set, wherein j is a positive integer less than or equal to N, and j, i, and k are different values.

17. The apparatus according to claim 14, wherein the first uplink channel is a physical uplink control channel (PUCCH), and the memory further comprises instructions that, when executed by the processor, cause the apparatus to:
determine, in a second PUCCH resource group, a second PUCCH resource set corresponding to the quantity of bits of the third HARQ-ACK, wherein the second PUCCH resource group comprises configured for a PUCCH that carries the third HARQ-ACK, the second PUCCH resource group comprises one or more PUCCH resource sets, and the second PUCCH resource group comprises time-frequency resources in the $j^{th}$ group of time-frequency resources in the N groups of time-frequency resources; and
determine the third time-frequency resource in the second PUCCH resource set, wherein j is a positive integer less than or equal to N, and j, i, and k are different values.

18. The apparatus according to claim 13, wherein the memory further comprises instructions that, when executed by the processor, cause the apparatus to:
when the first time-frequency resource partially or fully overlaps the second time-frequency resource, determine the first uplink channel that carries the first HARQ-ACK on a fourth time-frequency resource, and the second uplink channel that carries the second HARQ-ACK on a fifth time-frequency resource, wherein the fourth time-frequency resource is a time-frequency resource in the $m^{th}$ group of time-frequency resources comprised in the N groups of time-frequency resources, the fifth time-frequency resource is a time-frequency resource in the $n^{th}$ group of time-frequency resources comprised in the N groups of time-frequency resources, m and n are positive integers less than or equal to N, and m and n are different values.

19. A communications apparatus comprising:
a processor;
a memory coupled to the processor, the memory being configured to store computer-executable instructions; and
wherein the processor is configured to execute the computer-executable instructions stored in the memory, to enable the communications apparatus to perform:
sending a grouping relationship to a terminal device, wherein the grouping relationship represents a correspondence between a first parameter and N groups of time-frequency resources, the N groups of time-frequency resources are obtained by grouping time-frequency resources in one time unit, each group of time-frequency resources corresponds to one or more first parameters, the first parameter is related to downlink control information (DCI), a time-frequency resource in each group of time-frequency resources is a time-frequency resource of an uplink channel that carries a hybrid automatic repeat request-acknowledgement (HARQ-ACK), and N is a positive integer greater than or equal to 2; and
sending first DCI to the terminal device, wherein a first parameter related to the first DCI corresponds to the $i^{th}$ group of time-frequency resources in the N groups of time-frequency resources, and i is a positive integer less than or equal to N.

20. The apparatus according to claim 19, wherein the first parameter comprises one or more of a K1 value, a first time length, a codebook identifier, a radio network temporary identifier (RNTI), an uplink channel end symbol, a physical downlink control channel (PDCCH) monitoring occasion, or a start and length indicator value (SLIV) index, the K1 value is a time unit offset between a time unit in which a physical downlink shared channel (PDSCH) is located and a time unit in which an uplink channel of a HARQ-ACK corresponding to the PDSCH is located, and the first time length represents a time length corresponding to the K1 value.

* * * * *